United States Patent
Koitabashi

(10) Patent No.: US 6,533,392 B1
(45) Date of Patent: Mar. 18, 2003

(54) INK PRINTING METHOD AND INK-JET PRINTING APPARATUS FOR PERFORMING PRINTING WITH USE OF INK WHICH PERFORMS FUNCTION AS A PROCESSING LIQUID MAKING COLORING MATERIAL IN OTHER INK INSOLUBLE

(75) Inventor: Noribumi Koitabashi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/316,145

(22) Filed: May 21, 1999

(30) Foreign Application Priority Data

May 21, 1998 (JP) .......................................... 10-140268

(51) Int. Cl.$^7$ ................................................ B41J 2/21
(52) U.S. Cl. ........................... 347/43; 347/96; 347/100
(58) Field of Search .......................... 347/12, 15, 40, 347/41, 42, 43, 100, 96, 9; 106/31.13, 31.27, 31.43

(56) References Cited

U.S. PATENT DOCUMENTS

| | | | |
|---|---|---|---|
| 4,959,659 A | * 9/1990 | Sasaki et al. | 347/43 |
| 5,555,008 A | * 9/1996 | Stoffel et al. | 347/100 |
| 5,581,284 A | * 12/1996 | Hermanson | 347/43 |
| 5,767,876 A | * 6/1998 | Koike et al. | 347/43 |
| 5,801,738 A | * 9/1998 | Stoffel et al. | 347/100 |
| 5,833,743 A | * 11/1998 | Elwakil | 347/43 |
| 6,027,196 A | * 2/2000 | Gotoh et al. | 347/15 |
| 6,158,834 A | * 12/2000 | Kato et al. | 347/9 |

FOREIGN PATENT DOCUMENTS

| | | |
|---|---|---|
| EP | 0 534 635 A1 | 3/1993 |
| EP | 0 588 241 A2 | 3/1994 |
| EP | 0 831 135 A1 | 3/1998 |
| JP | 58-173669 | 10/1983 |
| JP | 8-281930 | 10/1996 |

OTHER PUBLICATIONS

Patent Abstracts of Japan, vol. 097, No. 002, Feb. 28, 1997 (with respect to JP 8–281930 of Oct. 29, 1996).

* cited by examiner

*Primary Examiner*—Lamson Nguyen
(74) *Attorney, Agent, or Firm*—Fitzpatrick, Cella, Harper & Scinto

(57) ABSTRACT

In a case of forming an image of a black series, a low concentration colored ink having an opposite polarity to that of a black series ink is added thereto in an overlaying manner. Then, the deviation can be made visually unrecognized for the low concentration of the colored ink even if the overlaid condition of inks is not within a predetermined range. In addition to an increase in density due to insolublization of the black series ink, this increase in the density of the black image can be achieved within a range in which no change is recognized in the hue. More specifically, a relation between an optical density according to a dye concentration of cyan ink or a thinning rate of cyan dots and permissible deviation to print quality is examined in advance, and the dye concentration or thinning rate of cyan ink is set in order to determine an optical density of cyan ink according to predictable or existing deviation on a printer.

52 Claims, 13 Drawing Sheets

| DYE CONCENTRATION | OD | PERMISSIBLE DEVIATION (μm) | UNPERMISSIBLE DEVIATION (μm) |
|---|---|---|---|
| 1% | 0.57 | 100 | 200 |
| 50% THINNING | 0.40 | 250 | 300 |
| 50% EJECTION-VOLUME LARGE | 0.34 | 250 | 300 |
| 50% EJECTION-VOLUME SMALL | 0.28 | 300 | 500 |

FIG.1A

SCANNING DIRECTION

SCANNING DIRECTION

INK PRINTING METHOD AND INK-JET PRINTING APPARATUS FOR PERFORMING PRINTING WITH USE OF INK WHICH PERFORMS FUNCTION AS A PROCESSING LIQUID MAKING COLORING MATERIAL IN OTHER INK INSOLUBLE

This application is based on patent application Ser. No. 10-140268 (1998) filed May 21, 1998 in Japan, the content of which is incorporated hereinto by reference.

BACKGROUND OF THE INVENTION

1. Field of the Invention

The invention relates to an ink printing method and an ink-jet printing apparatus, and specifically to an ink-printing method and an ink-jet printing apparatus for performing printing by using a processing liquid which make a coloring material in an ink insoluble.

2. Description of the Prior Art

As an ink-jet printer or the like come into widespread use, such devices are required to perform printing with higher quality as one of tendencies in such devices. It is well known that one of important factors to determine such print quality is an optical density (hereinafter simply called "OD") which is measured as that of an ink dot or a set 0ú ink dots formed printing medium. For example, when printing a character such as a letter of black, in general, the higher the OD of the dots formed with a black ink on a printing medium is, the higher contrast the printed characters provide to a color of a field of the printing medium, and this improves the printing in quality. Moreover, in other colors, for example, also in dots of cyan, magenta, or yellow, the higher ODs of these colors are, the clearer printed images are.

One of factors upon which an OD of a dot formed with the ink on the printing medium depend is an amount of a coloring material of the ink which does not penetrate into the printing medium but remains on a surface thereof. From this point of view, it is well known to increase an amount per se of ink ejected by a print head. As an easier method, for example, it is widely performed to scan the print head plural times for ejecting the ink plural times on a same point to increase an ink quantity to be given onto the printing medium.

As other method of allowing a large amount of the coloring material remain on a printing medium, there has been recently provided a method in which a processing liquid which makes the coloring material insoluble is applied onto the printing medium together with the ink and thereby the coloring material is made remain more to improve the density.

From this point of view, the assignee of this application provides a printing apparatus and a printing method disclosed in Japanese Patent Application Laying-open No. 8-281930 (281930/96). Here, for a print area of black, a black ink is ejected and the processing liquid is also ejected in a predetermined pattern of pixels. Moreover, this processing liquid also functions as cyan ink which is made cationic to be oppositely polarized to anionic black ink. Thus, it is possible to obtain the above-mentioned effect of increasing the density by making the coloring material in the black ink insoluble. Further, the increase in the optical density is aimed at while preventing color tone from deviating by performing printing in other colors in a pattern simultaneously.

Moreover, according to the invention described in the above-mentioned gazette, a print head provided for the processing liquid is not required. Also, it is possible with a simple configuration to achieve the effects such as an improvement in water resistance and prevention from feathering and bleeding by use of the processing liquid, in addition to improvement of print quality due to increasing in the density.

A similar art disclosed in a gazette of EP A 831135 with respect to European Patent Application is also known. The gazette discloses that a light color ink, which is low concentration ink of magenta or cyan, is applied to the printing medium in an overlaying manner with the black ink and the light color ink is made have property that insolubilizes the black ink.

However, in any of the methods described above of increasing the density, it may occur that printing quality is degraded due to a deviation of respective dots of ink from each other. This deviation of dots occur when plural times of ink ejection are performed to overlay dots, or when a dot of the black ink and the cyan ink or the light color ink, which functions as the processing liquid, are overlaid.

For example, in the case that a serial type print head is used for printing, ejection position may become uneven among multiple-time scanning of the print head for ejecting ink multiple times on a same position, due to uneven motions of a carriage. Thus, the above-mentioned deviation of ink dots upon overlaying them.

Moreover. even when using, what is called, a full line type print head which is fixedly used on a printing apparatus, it may happen that a plurality of heads are not in normal positional relation to each other. Thus the ejection positions between. for example, the black ink and the cyan ink functioning as the processing liquid, which are ejected from the plurality of heads are made to deviate. Especially, this full line type print head is of a long-size for arranging relatively large amount of ejection orifices which are arranged in extent corresponding to a width of printing paper fed for printing. Therefore, the deviation may sometimes extend to that equivalent to about a few pixels which are arranged in 600 dpi. Furthermore, it is not easy to register positions of the ejection orifices among the plurality of heads for decrease the above-mentioned deviation. Moreover, a variation in accuracy of feeding the printing medium also may cause the above-mentioned deviation of the ink dots in overlaying them.

Furthermore, the above deviation may be caused also when there are variations in the direction of ejected ink between the print heads. For example, in case that some of the corresponding ejection orifices of the respective heads for ejecting inks at a same position are deflected in the ejecting directions, the ink or the ink equivalent to the processing liquids from that ejection orifices are not ejected at the position to be originally targeted on. Thus, the deviation is caused in overlaying them.

As mentioned above, if the deviation of ink dots is caused when plural inks are ejected one upon another or ink and a colored processing liquid (the processing liquid functioning as an ink for printing) for making the ink insoluble is ejected in a overlaying manner for aiming at an increase in OD, the deviation becomes noticeable due to the difference between hues of the dots. As a result of this, the print quality is degraded.

Especially, since structures employing the color ink making the black ink insoluble, which are disclosed in the above-mentioned two gazettes, do not take into consideration of a relation between the difference between hues of inks which are deviated from each other and the degradation of print quality owing to such difference of the hues, the deviation and the difference of hue interact with each other so that the print quality is more seriously degraded.

It has been proposed to improve an accuracy of head mounting or paper feeding. However, it sometimes brings about such problems as an increase in the device cost or complexity in adjustment procedures, etc.

SUMMARY OF THE INVENTION

The objects of the present invention is to provide an ink print method and an ink-jet printing apparatus which can achieve an improvement in print quality beginning with an increase in density of printed image while permitting the deviation even if it is caused in overlaying of ink dots owing to the above-described various factors.

The applicant of the present invention has achieved this invention by paying attention to and examining a relation between a mutual deviation value between plural ink dots and a relative density in a range in which this deviation does not have a significant influence on the print quality.

Another object of the present invention is to provide an ink print method and an inkjet printing apparatus in which, in a case of forming an image of a black series, a low concentration colored ink having an opposite polarity to that of a black series ink is added thereto in an overlaying manner, the deviation can be made visually unrecognized for the low concentration of the colored ink even if the overlaid condition of inks is not within a predetermined range, and in addition to an increase in density due to insolubility of the black series ink, the increase in the density of the black image within a range in which no change is recognized in the hue.

In the first aspect of the present invention, there is provided an ink printing method comprising the steps of:

employing a black series ink and a low concentration colored ink which has a lower concentration than a colored ink with higher lightness than that of the black series ink, has a same series of color as that of the colored ink and has a polarity different from the black series ink; and forming an image of a black series by at least a partly making the black series ink react with the low concentration colored ink.

In the second aspect of the present invention, there is provided an ink printing method comprising the steps of:

employing a black series ink, one of or a plurality of colored inks having higher lightness than the a black series ink and a low concentration colored ink which has a lower concentration than the colored ink, has a same type of color as that of the colored ink and has a partly different from that of the black series ink; and forming an image of a black series by at least partly making the black series ink react with the low concentration colored ink.

In the third aspect of the present invention, there is provided an ink printing method comprising the steps of:

employing, a plurality of colored inks different from a black series ink and having higher lightness than that of the black series ink, and a low concentration colored ink having a lower concentration than that of the colored ink and a different polarity from that of the colored ink; and forming an image of a color by at least partly making the colored ink react with the low concentration ink.

In the fourth aspect of the present invention, there is provided an ink-jet printing apparatus for performing printing by means of ink ejection parts respectively ejecting a black series ink, and a low concentration colored ink which has a lower concentration than a colored ink with higher lightness than that of the black series ink, has a same series of color as that of the colored ink and has a polarity different from the black series ink, wherein an image of a black series is formed by at least partly making the black series ink react with the low concentration colored ink.

In the fifth aspect of the present invention, there is provided an ink-jet printing apparatus for performing printing by means of ink ejection parts respectively ejecting a black series ink, one of or a plurality of colored inks having higher lightness than the a black series ink and a low concentration colored ink which has a lower concentration than the colored ink, has a same series of color as that of the colored ink and has a polarity different from that of the a black series ink wherein an image of a black series is formed by at least partly making the black series ink react with the low concentration colored ink.

In the sixth aspect of the present invention, there is provided an ink-jet printing apparatus for performing printing by means of ink ejection parts respectively ejecting a plurality of colored inks different from the a black series ink and having higher lightness than that of the black series ink, and a low concentration colored ink having a lower concentration than that of the colored ink and a different polarity from that of the colored ink, wherein a colored image is formed by at least partly making the colored ink react with the low concentration colored ink.

In the seventh aspect of the present invention, there is provided a low concentration colored ink which is employed together with a black series ink and one or a plurality of colored inks having higher lightness than the black series ink in a printing apparatus, has lower concentration than the colored ink and has a same series color as the colored ink, wherein the low concentration colored ink has opposite polarity to at least the black series ink to have a function of making the black ink insoluble.

In the eighth aspect of the present invention, there is provided an ink set comprising:

a black series ink; and a low concentration ink which has lower concentration than a colored ink having higher lightness than the black series ink, has a same type color as the colored ink, and has an opposite polarity to the black series ink to have a function of making the black series ink insoluble.

In the ninth aspect of the present invention, there is provided an ink set comprising:

a cyan ink; and a low concentration cyan ink having an opposite polarity to a black series ink to have a function making the black ink insoluble and having lower concentration than the cyan ink.

In the tenth aspect of the present invention, there is provided an ink set comprising:

a black series ink;

a yellow ink;

a magenta ink;

a cyan ink; and a low concentration cyan ink having a function making at least the black series ink insoluble and having lower concentration than the cyan ink.

In the eleventh aspect of the present invention, there is provided an ink manufacturing method of manufacturing a low concentration colored ink which is employed together with a black series ink and one or a plurality of colored inks having higher lightness than the black series ink in a printing apparatus, has lower concentration than the colored ink and has a same series color as the colored ink has, the method comprising the steps of:

providing a coloring material for the low concentration colored ink having an opposite polarity to the black series ink to have function making the black ink insoluble; and adding a solvent to the coloring material to manufacture the low concentration colored ink.

In the twelfth aspect of the present invention, there is provided a rubbing resistance improving method used when performing printing with a black series ink and a low concentration colored ink having lower concentration than a colored ink which has higher lightness than the black series ink, having a same series color as the colored ink and having a function making the black series ink insoluble, the method comprising the steps of:

ejecting the black series ink; and ejecting the low concentration ink on the black concentration ink after ejection of the black series ink.

In the thirteenth aspect of the present invention, there is provided an ink ejection data generation method comprising the steps of:

providing ejection data for a black series ink; and generating ejection data for a low concentration colored ink having lower concentration than a colored ink which has higher lightness than the black series ink, having a same series color as the colored ink and having a function making the black series ink insoluble, so that a dot pattern is formed on a printing medium in a pattern according to a predetermined algorithm, on a dot pattern of the black series ink formed based on the ejection data for the black series ink.

The above and other objects, effects, features and advantages of the present invention will become more apparent from the following description of embodiments thereof taken in conjunction with the accompanying drawings.

BRIEF DESCRIPTION OF THE DRAWINGS

FIGS. 1A and 1B are drawings explaining a relation between ODs realized by a cyan ink dot and permissible deviation amount of overlaid cyan ink dot and black ink dot from each other.

FIG. 7 is a flowchart showing generating procedure performed in the control configuration shown in FIG. 6 for generating ejection data of light cyan ink in relation to printing black image or the like.

DETAILED DESCRIPTION OF PREFERRED EMBODIMENTS

Figure 1B:
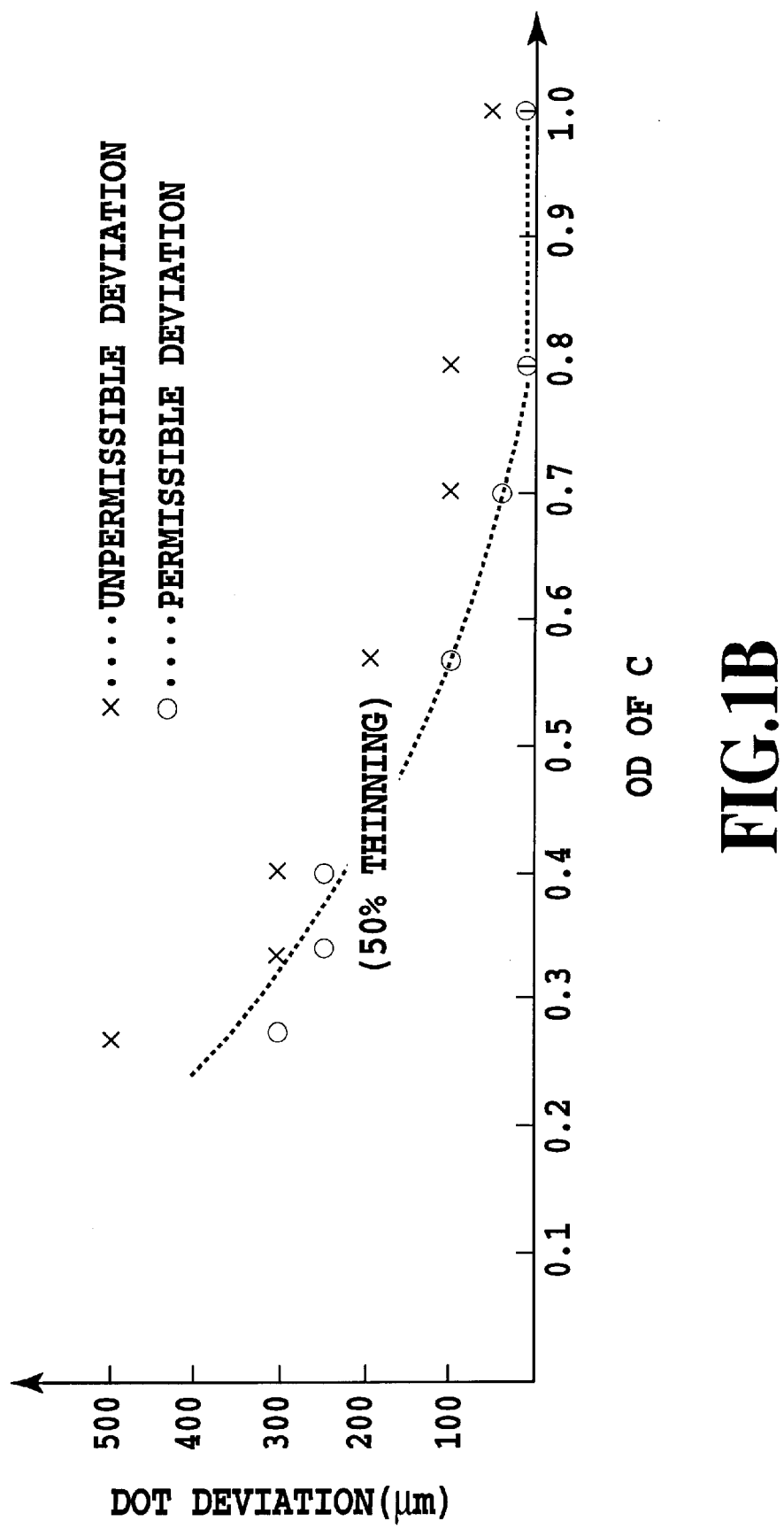

Preferred embodiments of the present invention will be described in detail below referring to the drawings.

In one embodiment of the present invention, when characters, etc. are printed with black ink (hereafter also simply called "Bk"), a low concentration light cyan (hereafter also simply called "light C") is applied on a part or whole part of pixels on which the black ink is applied in an overlaying manner. In addition, when the Bk ink has a polarity of anionic, the light C ink is made to have a reverse polarity to be cationic, and thus, the Bk ink and light C ink are mixed on a printing medium to cause a coloring material in the Bk ink to be insoluble or coagulated.

FIGS. 1A and 1B are a chart and a graph respectively explaining permissible deviation values which are hard to be visually recognized and not permissible deviation values which cause degradation of print quality with respect to respect ODs of cyan ink.

In an example shown in a chart of FIG. 1A, a distinction between the permissible deviation value and the not permissible deviation value has been examined with respect to C inks, which are used as that of respective 1% and 0.5% concentrations of dye as a coloring material. The C ink of 1% dye concentration has about 1/3 times dye concentration as that of C ink which is generally used for printing, and therefor, the 0.5% dye concentration has about 1/6 times dye concentration as that of the general use C ink. Moreover, with respect to the C ink of 1% dye concentration, the distinction between the permissible deviation value and not permissible deviation value has been investigated also in the case that quantity of the C ink applied to Bk ink is thinned at 50%. Further, with respect to the C ink of 0.5% dye concentration, the distinction of those deviation values has been examined concerning two different ejection amounts. It should be noted that the eject amounts are made differentiated from each other by means of a method which has a case of increasing the ejection amount by using what is called a double pulse and a case using a normal single pulse. The double pulse method has been proposed by the assignee of the present application.

The ODs for each of the above dye concentration become 0.57, 0.40, 0.34, and 0.28 respectively, as shown in FIG. 1A. The measurements of these ODs have been carried out as follows. Forming of dots is performed on a predetermined size of area on the printing medium with each ink of the above-mentioned dye concentration so that an area factor becomes 100% with performing what is called solid printing (100% duty) or so that dots are formed in thinning pattern of 50%. Then, the ODs of the formed dot patterns are measured by using a Macbeth density meter.

Figure 2:
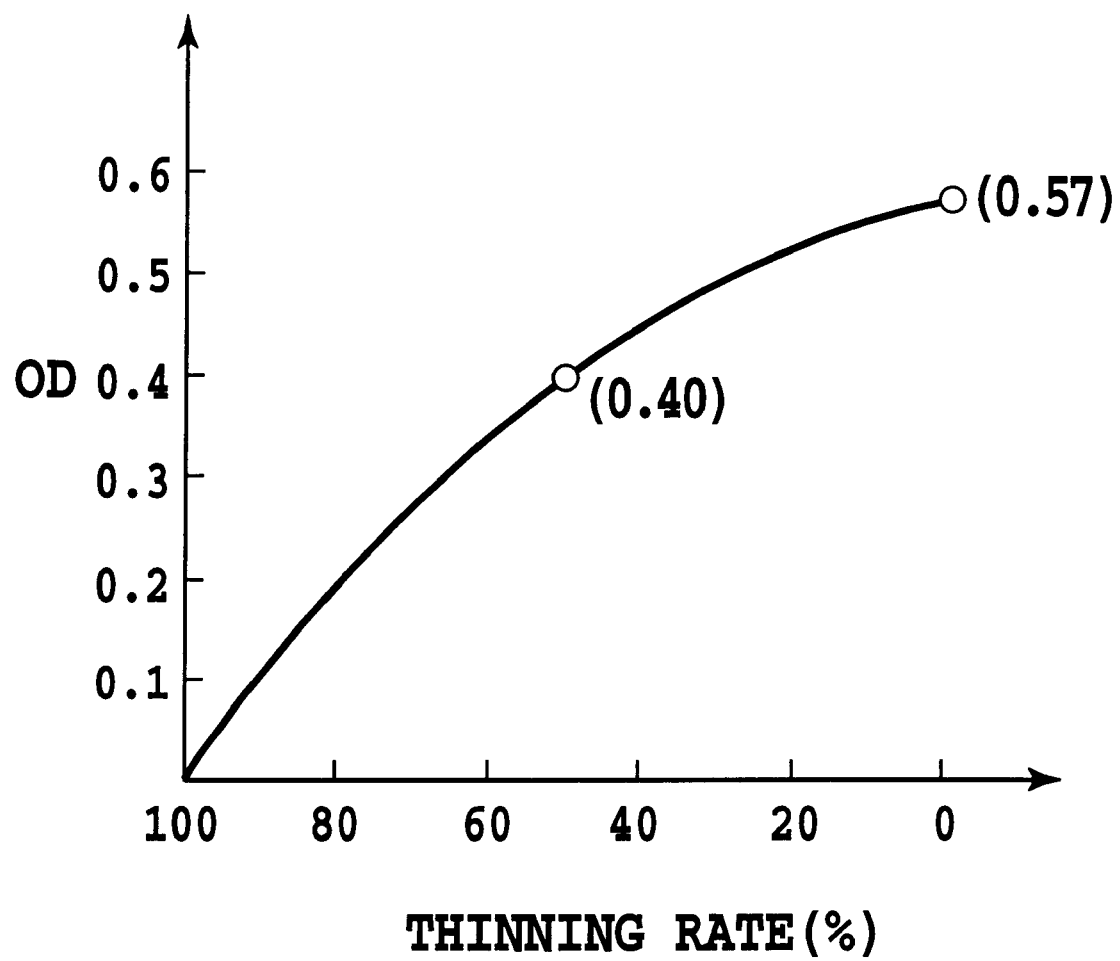
FIG. 2 is a graph showing a relation between a thinning rate in cyan ink dot pattern and OD realized by the pattern.

FIG. 2 is a graph showing an example of the relation between a thinning rate in forming dots and an OD measured thereto. It is apparent from the graph that a value of the OD is not reduced by 50% for 50% thinning rate as it varies from 0.57 to 0.4.

Referring to FIG. 1A again, it has been evaluated whether or not deviations of C ink dots for each OD are permissible, and permissible deviation values and not permissible deviation values have been determined. FIG. 1B is a graph obtained by plotting a relation between the ODs and the deviation values.

Figure 3B:
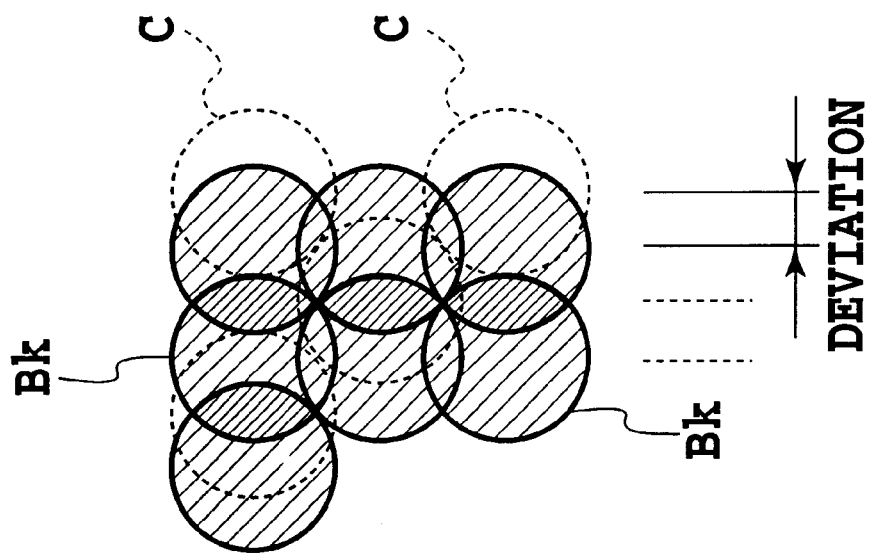
FIGS. 3A and 3B are drawings schematically showing respective deviations of cyan ink dots in the case that the cyan ink of respective 100% duty (the thinning rate is 0) and 50% of thinning rate are overlaid on the black ink.
Figure 3A:
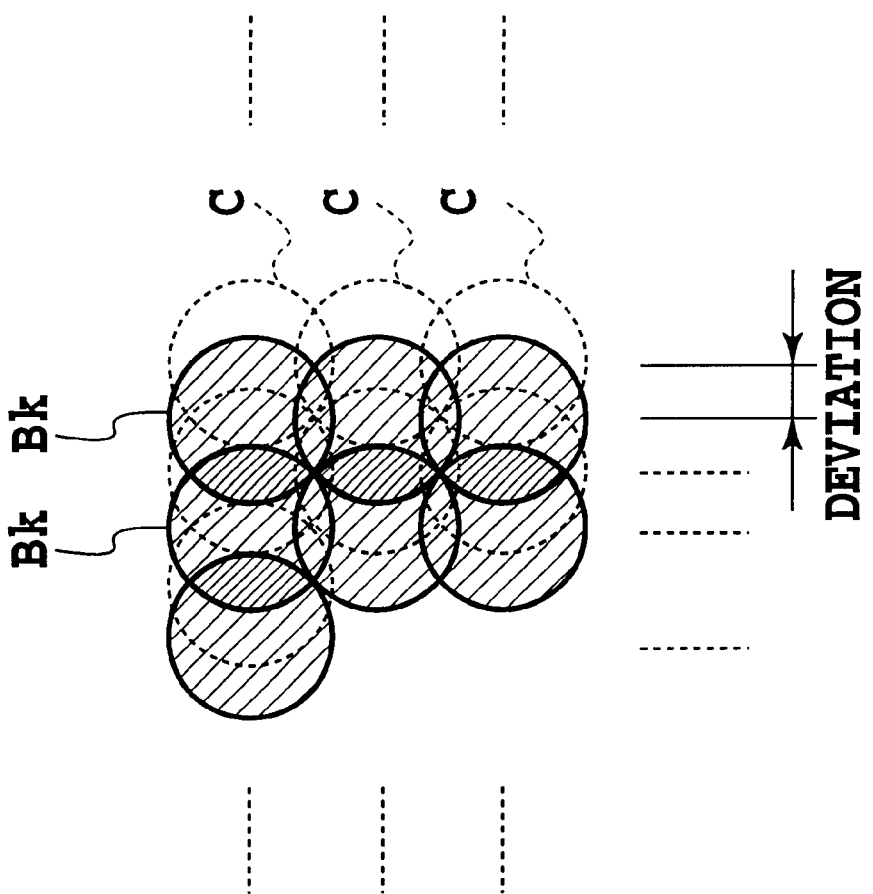

More specifically, as shown in FIG. 3A, the solid printing is performed with C ink in a condition of deviating forming positions with various deviation values, onto the solid printing with Bk ink (in this case, an OD value of 0.57 is obtained from the solid printing per se with, for example, 1% C ink as aforementioned, and the same with others), and as shown in FIG. 3B, C ink is applied with various deviation values and 50% thinning rate, onto the solid printing with Bk ink (in this case, an OD value of 0.4 is obtained from a pattern per se with C ink as aforementioned). Then, evaluation is performed in both cases whether or not the deviations are visually noticeable.

It should be noted that this evaluation has ben performed as follows. A single person observes the printed dot pattern with naked eyes and at a distance of 20 cm to a printing paper on which the dots pattern is printed in the above manners and judges whether or not the deviation is noticeable. Moreover, dots have been formed with an arrangement density of 600 dpi in the lateral and longitudinal directions in FIGS. 3A and 3B. Further, with respect to the evaluations shown in FIGS. 1A and 1B, "a not permissible deviation value" (marked with "x" in FIG. 1B) means such a deviation value as the deviation is extremely noticeable, the deviation becomes gradually not so noticeable with decreasing deviation value from the extremely noticeable value, and at "a permissible deviation value" (marked with "○" in FIG. 1B), the deviation substantially can not be recognized.

The relation shown in FIG. 1B is one in the case where the OD of black pixel formed with Bk and C inks is that within 1.4–1.6. When the OD of black image printed is smaller than that values, the gradient of a curve showing the relation becomes smaller in a range having smaller OD than 0.6 of C ink dot, bordered thereon, and the permissible deviation value becomes slightly smaller. However, when the above-mentioned OD of black pixel is not smaller than 1.0 at least, a shape of the curve is almost the same as that shown in FIG. 1B in a point that the permissible deviation value becomes steeply larger in the range of OD of C ink dot at 0.6 and smaller.

Based on the relation between an OD of C ink dot and a permissible deviation value obtained in the above-mentioned manner, an OD of C ink dot upon performing printing with an ink-jet printing apparatus can be determined, for example, as follows.

When the ink-jet printing apparatus uses full line type heads and deviation between dots of Bk ink and C ink is predicted to be an amount of 5 elements at a maximum in the arrangement density of 600 dpi, thus, the amount of approximately 200 μm, an OD range of C ink dot is firstly determined, in which range the deviation is not noticeable even when the maximum deviation is caused. According to the relation shown in FIG. 1B, this range is that of 0.4 or less substantially. Moreover, in the case of achieving this OD range with thinning dot pattern of C ink, if the thinning rate is increased in order to reduce the OD, an absolute quantity of Bk ink and C ink reacting with each other to be made insoluble is reduced and an increase in density and various effects by this insolubility can not be expected. Therefore, it is not desirable to increase the thinning rate. On the other hand, if the concentration of the C ink is lowered too much, an increase in the density of the black image by applying C coloring material can not be expected. It is not desirable. Further, it is desirable to make the optical density of a solid picture printed with light C ink, which has low dye concentration, about 1/2 times of the optical density of a solid picture printed with usually used C ink to form a halftone image suitably. Therefor, if the concentration of the C ink is made too light, it becomes difficult to design the halftone image. As a result, it is desirable for the OD of C ink dot to be 0.2 or larger in any case. Moreover, considering that a maximum deviation at an amount as large as 200 μm is rarely caused in accuracy of a usual print head installation and a usual paper feeding, the OD achieved with C ink may practically be in a range of 0.2–0.6 including the range of 0.4 and larger.

It should be noted that in the case of employing the C ink achieving such OD, the higher the concentration of C ink is, the higher the OD of a black dot formed with the C ink and a Bk ink becomes. As a result of this, an ejection amount of Bk ink can be decreased by increasing the concentration of the coloring material in the C ink. However, when the concentration of the C ink is made increased too much, the OD by the C ink exceeds the above-mentioned range of OD and result in that the deviation becomes noticeable.

Such the OD range of 0.2–0.6 of C ink dot is achievable by using a relatively light ink of 5% or 1% dye concentration as is apparent, for example, from FIG. 1A. As described above, this concentration of 0.5% and 1% are 1/6 and 1/3 times as that of dye concentration of normally used C ink, respectively. In this specification, such an absolutely low concentration of ink is called "light ink". Also, as will be described later, when two inks of a similar color and different concentration are used, one ink of a relatively lower concentration and used for overlaying with Bk ink is also called "light ink".

Next, an ink-jet printer using a combination of the above-described Bk ink and light ink representing different polarity from the Bk ink and being applied thereto will be explained as an embodiment of the present invention.

FIGS. 4A–4D are drawings schematically showing arrangements of print heads on such ink-jet printers as mentioned above, respectively. These figures illustrate full line type print heads from the side view point with respect to the direction of paper feeding, and a combination of the print heads shown in each figure is not limited to such full line type. It is apparent that the combinations of serial type print heads arranged on the carriage as shown in each figure may be allowed.

Figure 4A:
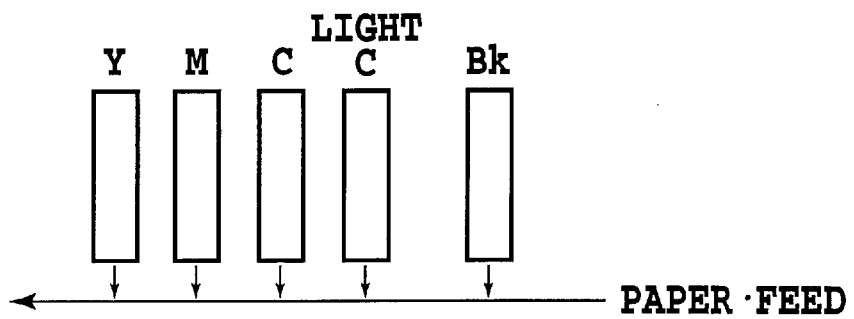
FIGS. 4A–4D are drawings showing combinations of inks used for printers related to embodiments of the present invention.

In the arrangement shown in FIG. 4A, the print heads arranged from the upstream side to the downstream side in the direction of paper feeding eject Bk ink, light C ink, C ink, magenta (hereafter, simply described "M") ink, and yellow (hereafter simply described "Y") ink, respectively. In this configuration, when characters are printed in black, as described above, the ejection of light C ink from a light C head is performed in addition to the ejection of Bk ink from a Bk head. In this case, the concentration of a coloring material of a dye or a pigment in light C-ink can be made in the range of 0.3%–1.5%. Thus, even when a positional deviation is caused on the individual ejection positions of these light C ink and Bk ink, it is possible to make the mutual deviation of the dots due to deviation of the ejection positions not noticeable. Moreover, the coloring material concentration of this light C ink corresponds to 1/2.5–1/6 times as that of the coloring material concentration of C ink used in the printer of this embodiment.

Moreover, light C ink has cationic polarity, while Bk ink and other Y, M, C inks have oppositely anionic polarity, and this make each color material insoluble or coagulated when Bk ink is overlaid with the light C ink. Thus, predetermined effects such as an improvement in density of Bk ink dots, a reduction in feathering, and an improvement in water resistance, etc. can be achieved.

Further, the light C ink and the C ink are applied together with each other in a predetermined reproducing density area for reducing granular feeling especially in a low density part and for achieving smooth changes in gradation. This can be achieved as follows. A predetermined density distribution table is used to convert input density data of cyan, in a range of relatively small input density data of cyan, into density data of the light C ink according to the value of the input data, and to convert them, in a range of large input data, into individual density data of the light C ink and the C ink in a distributing manner. In the latter conversion, the larger the input density data value is, the more the distribution ratio for the C ink is increased. In the case that such a configuration is adopted to the printer, the OD achieved by solid printing with light C ink is preferred to be 1/2 times as that of the OD by the C ink. In order to realize this relation, it is desirable that a ratio of a color material concentration of the light C ink to that of the C ink is 1/2.5–1/6 and the OD in this relation also can be achieved by thinning of dots, as described above.

Figure 4B:
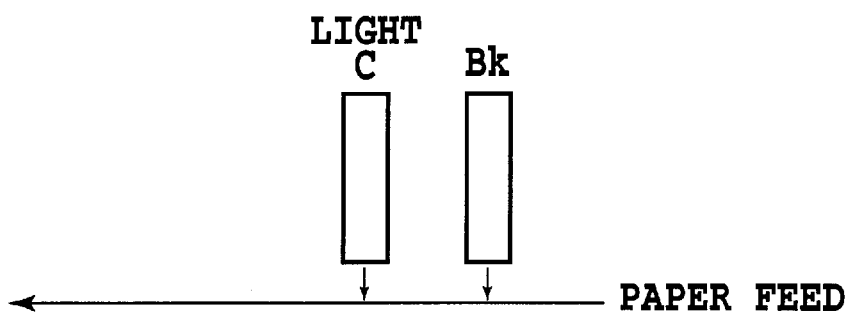

FIG. 4B shows an arrangement of print heads for performing monochrome printing in black, and a case of employing a combination of respective print heads for Bk ink and light C ink. In this case, also, the Bk ink is anionic and the light C ink to be applied on the Bk ink is cationic, having an opposite polarity to that of the Bk ink.

Figure 4C:
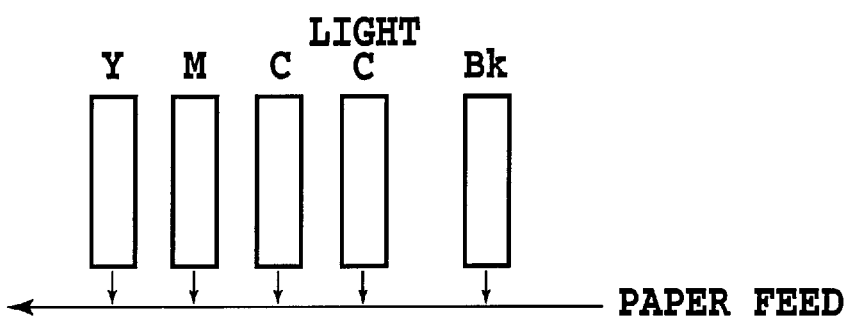

In a configuration shown in FIG. 4C, low concentration blue (also simply described "B") ink, or light blue ink, is used instead of the light C ink. The use of blue series ink which is similar-colored ink to C ink can achieve substantially same effect as the case of overlaying the light C ink on Bk ink. Moreover, this light B ink is used together with C ink by using the specified density distribution table as described above. It should be noted that the above-stated blue series ink means ink containing coloring materials of blue and cyan which are the coloring material for the B ink and the C ink, respectively.

Figure 4D:
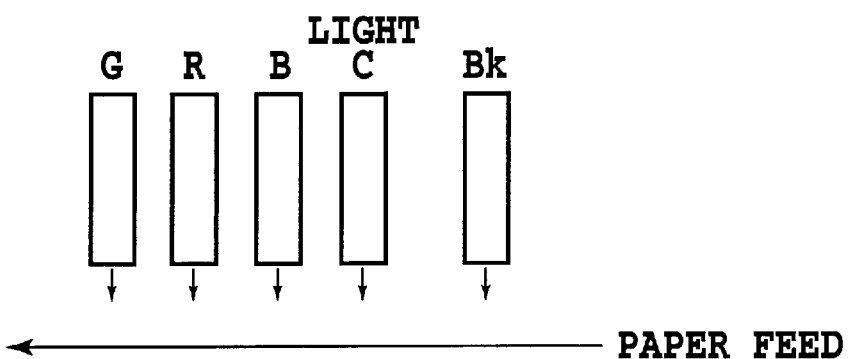

Further, FIG. 4D shows a configuration wherein B ink, red (hereafter simply described "R") ink and green (hereafter simply described "G") ink are used instead of C, M, and Y inks in response to the use of the light B ink. Also in this configuration, it remains unchanged that the light B ink is ejected and overlaid on Bk ink when black characters, etc. are printed.

Moreover, in the embodiments shown in FIGS. 4A, 4C and 4D, the light C ink or the light B ink of similar series to the light C ink are used for the inks to be overlaid on Bk ink. However, kinds of overlaying light inks are not to be restricted to them. For example, the use of light M ink or light Y ink also makes it possible to carry out printing without recognition of dot deviation when an OD realized by their color material concentrations is appropriately determined. However, ink dots of C or B ink have relatively low lightness and have rather close hues to that of Bk ink, therefore, it is desirable to use light C ink or light B ink for decreasing recognition of the dot deviation. Further, considering that dye for Bk ink is slightly changed to brown due to insolubilization of the dye and hue of pigment for Bk ink have a reddish tint, cyan or blue inks, which are complementary color to red, is preferable from the viewpoint of a tone correction and increasing of optical density. Moreover, from the viewpoint of reducing granular feeling when printing in colors, the C ink and the B ink are apt to produce a remarkable granular feeling because they have relatively low lightness as described above. Therefore, it is more desirable from the viewpoint of improving print quality to reduce the granular feeling by using light ink of these inks.

Also, as for coloring materials, cationic dyes can be used, for example, for the light C ink or the light B ink, while an anionic dye can be used for each of Bk ink as well as Y, M, C inks or G, R, B inks. Especially, from the viewpoint of density increase with Bk ink, it is more preferable to use an anionic pigment or a mixture of this anionic pigment and an anionic dye as the coloring material for Bk ink. Further, the coloring material for Bk ink may be a mixture of an anionic pigment without dispersing agent and a anionic dye.

Further, a light ink to be overlaid on Bk ink is not limited to be the cationic ink. For example, the prescribed effect of the present invention can be achieved even if this light ink is made to be anionic and at least Bk ink in the other inks is made to be cationic.

In addition to this, an ejection order of the anionic and the cationic inks is not limited to one way for obtaining the above-described effect of the present invention. However, as discussed in FIGS. 4A–4D, it is preferable that the light C of cationic is ejected after the Bk ink to be made insoluble is ejected so that the light C ink is overlaid on the Bk ink. More specifically, the coloring material on the printing medium is covered with the cationic dye to improve rub resistance against rubbing a character, an image or the like printed on the printing medium with a line-marker, for example.

Detailed definite example of the above-described embodiments will be explained below referring to the drawings.

EXAMPLE 1

Figure 5:
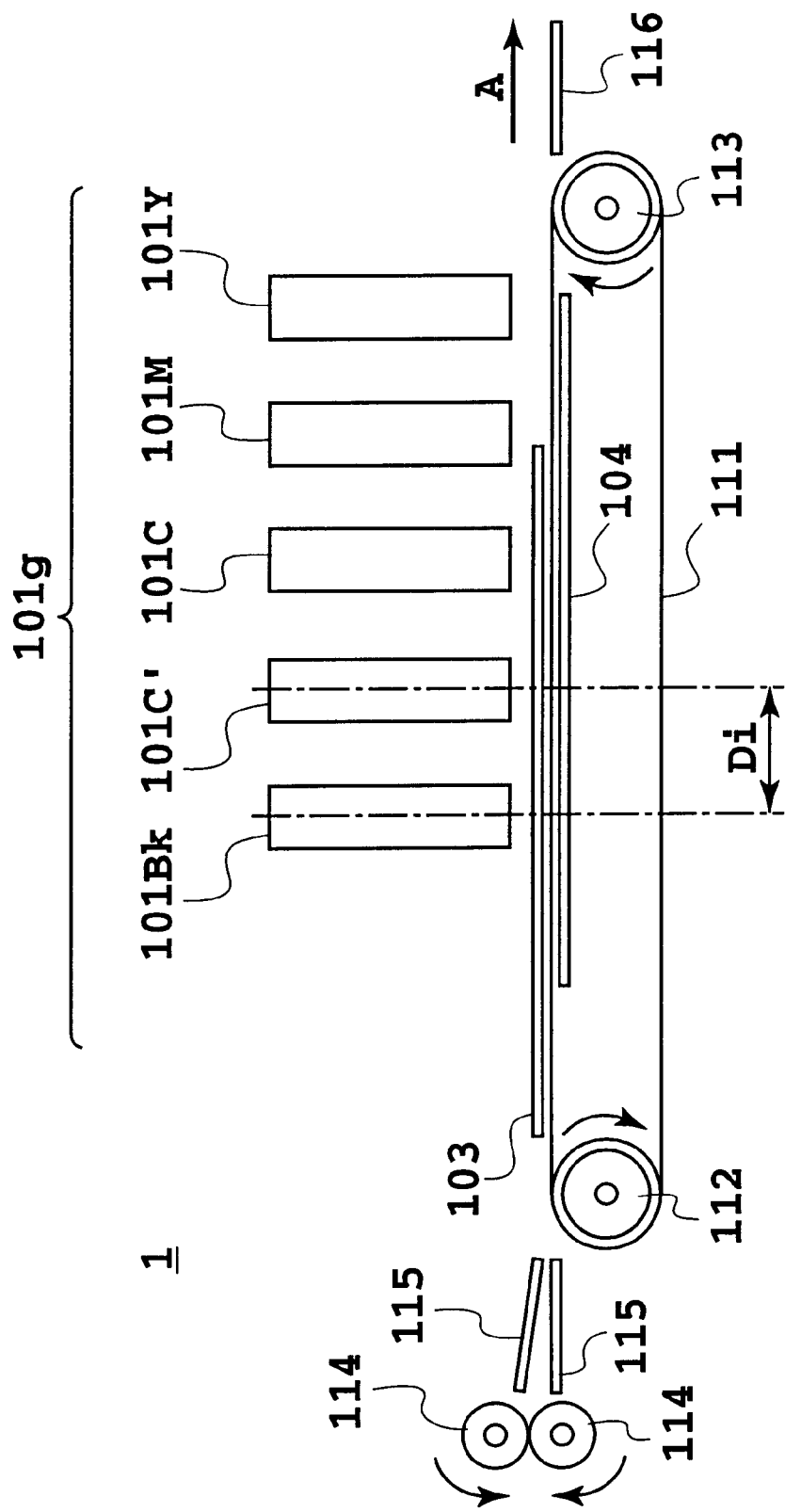
FIG. 5 is a side view showing a schematic configuration of a printing apparatus related to one embodiment of the present invention.

FIG. 5 is a side view showing an outline of a configuration of a full line type printing apparatus related to the first example.

Figure 6:
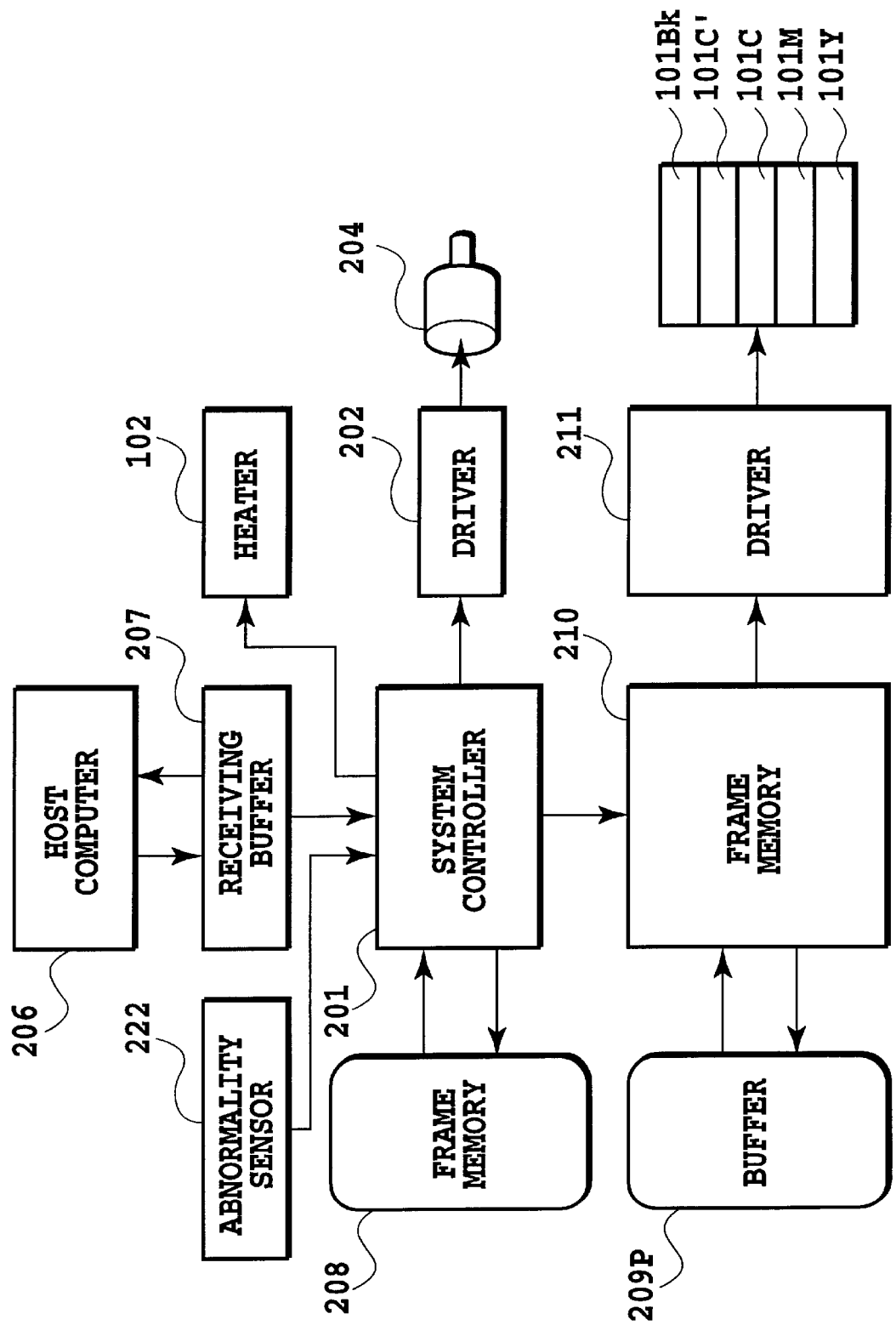
FIG. 6 is a block diagram showing a control configuration of the printing apparatus shown in FIG. 5.

This printing apparatus 1 adopts an ink-jet printing system for carrying out printing by ejecting inks from plural full line type print heads arranged at predetermined positions along a feeding direction (the direction of the arrow A in the figure) of a printing medium as a printing medium. The apparatus operates with control by a control circuit shown in. FIG. 6 as will be described later.

Each print head 101Bk, 101C', 101C, 101M, and 101Y of a head group 101g is provided with approximately 7200 pieces of ink ejection orifices with a density of 600 dpi arranged in the width direction of printing paper (direction vertical to the plane of the figure). Each head is capable of printing on an A3-size printing paper.

The printing paper 103 is fed in the direction of the arrow A by the rotation of a pair of resist-rollers 114 driven by a transport motor, and is guided by a pair of guide plates 115 and the leading edge is registered before transported by the handler belt 11. The endless handler belt 111 is held by two pieces of rollers 112, 113, and vertical deviation of its upper side part is restricted by a platen 104. The printing paper 103 is transported by means of rotary driving of the roller 113. Moreover, the printing paper 103 is absorbed with an electrostatic force on the handler belt 111. The roller 113 is rotatably driven by a driving source of unshown motor, etc. so as to transport the printing paper 103 in the direction of the arrow A. The printing paper 103, on which printing has been carried out by the printing head group 101g during the transportation on the handler belt 111, is discharged onto a tray 116.

As for each print head of the printing head group 101g, the head 101Bk1 ejecting Bk ink described in the above mode of the embodiment, the head 101C' ejecting cationic light C ink with an opposite polarity to the Bk ink, and the heads 101M, 101Y ejecting M-ink and Y-ink respectively are arranged in the transport direction A of the printing paper 103 as shown in the figure. And, it becomes possible to print characters in black and pictures in color by ejecting each color ink from each print head. Here, as for a black picture, the light C ink is ejected to be overlaid on the Bk ink as described in the aforementioned embodiment.

FIG. 6 is a block diagram showing a control configuration of the full line type printing apparatus 1 illustrated in FIG. 5.

A system controller 201 comprises firstly a microprocessor, ROM storing a control program executed in this device, RAM used for a work area when the microprocessor operates processing, etc., and executes the control of the whole device. A motor 204 is controlled in the driving via a driver 202, and drives the roller 113 shown in FIG. 5 to transport the printing paper.

A host computer 206 transfers printing information to the printer 1 of this example, and controls its printing operation. A receiving buffer 207 temporarily stores data from the host computer 206, and keeps the data accumulated until a system controller 201 starts reading the data. A frame memory 208 is a memory for developing the printing data into image data, and has a necessary size of memory for printing. This example is described, assuming that the frame memory 208 has a memory capacity enough to store information for one sheet of printing paper, however, the present invention is not to be restricted by a capacity of the frame memory.

A buffer 209P temporarily stores the printing data, and has a memory capacity corresponding to the number of the print heads and the number of the eject orifices of each head. A print control part 210 is one for properly controlling the drive of the print heads according to the instruction from the system controller 201, and controls a drive frequency, the number of print data, etc., and further, creates data for ejecting the light C ink to be overlaid on the Bk ink based on the ejecting data of the Bk ink, to add it to the data of the light C ink as a picture. A driver 211 is one for eject-driving of the print heads 101Bk, 101C', 101C, 101M, 101Y for letting them eject each ink, and controlled by a signal from the print control part 210.

In the above configuration, the print data are transferred from the host computer 206 to the receiving buffer 207 to be temporarily stored. Next, the stored print data are read out by the system controller 201 and developed into the buffer 209P. Moreover, it is possible to detect a paper jam, paper run-out, etc. by various detection signals from abnormality detection sensors 222.

The print control part 210 creates data for ejecting the light C ink and stores them in the buffer 209P, based on the Bk ink data of the picture data developed into the buffer 209P. Thus, OR data of the light C ink data at the time of forming these black dots and the light C ink data at the time of forming cyan dots used together with the C ink or used alone are to be stored in the buffer 209P. Based on the print data thus developed in the buffer 209P, the print control part controls the ejecting operations of each print head.

Figure 7:
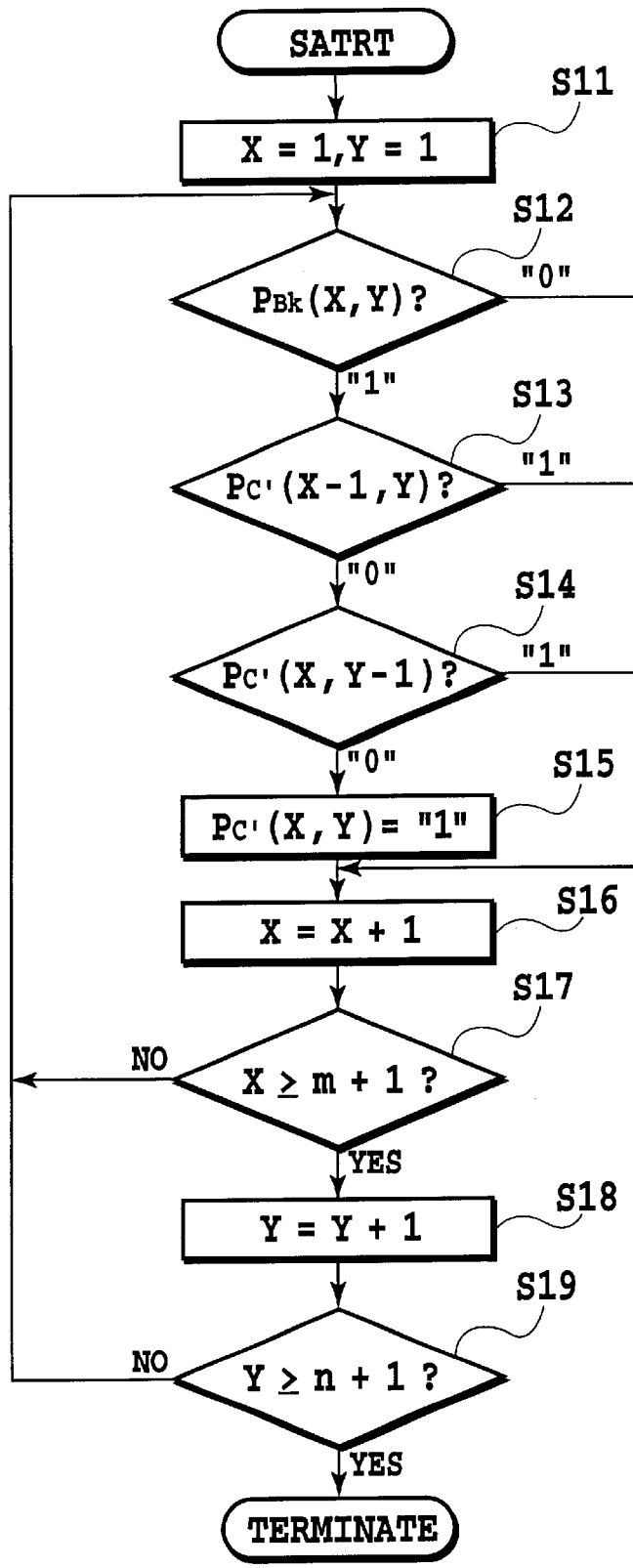

FIG. 7 is a flowchart showing a ejection data generating procedure for the light cyan (C') ink, mentioned above.

The ejection data of the light C ink is generated based on the ejection data of Bk ink stored in the buffer 209P shown in FIG. 6. More specifically, bitmap data of an amount equivalent to one page, which data is obtained by making image data binary to which a predetermined image processing has been done, is stored for each C, light C, M, Y and Bk color. The procedure thins the ejection data of Bk ink at rate of 50% to generate the ejection data of the light C ink to be overlaid on the Bk ink, as thinned data. A concentration of dye in the light C ink is 1% in this embodiment and is determined so that OD measured for a pattern becomes 0.4 when the pattern is printed by using the light C ink of the above-mentioned concentration at thinning rate of 50%. Moreover, the procedure of this embodiment generates the ejection data of one page for suitably responding to a printing speed of the full line heads.

When this procedure is initiated, at first, parameters X, Y representing respective pixel locations is initialized (step S11). Here, the parameter X shows the pixel location in a direction corresponding to an arrangement direction of ejection orifices on the print head and the parameter Y shows the pixel location in a direction corresponding to a transporting direction of the printing medium.

Next, at step S12, a judgement is made as to whether ejection data $P_{Bk}$ (X, Y) of Bk ink is "1" (ejection) or "0" (not ejection) with respect to the pixel locations X, Y which are subject pixels of this processing. In the case that the judgement is made "1", at step S13, a judgement is made whether ejection data $P_{C'}$(X−1, Y) of the light C ink is "1" (ejection) or "0" (not ejection). The data $P_{C'}$(X−1, Y) is ejection data of a pixel sifted in a X-direction by one pixel and is determined immediately before. When this judgement is made "0", at step S14, judgement is further made whether ejection data $P_{C'}$(X, Y−1) of the light C ink is "1" (ejection) or "0" (not ejection). The ejection data $P_{C'}$ (X, Y−1) is corresponding ejection data of pixel located sifted by one line of pixels to the subject pixel. In the case of judging that the ejection data $P_{C'}$ (X, Y−1) is "0", at step S15, the ejection data $P_{C'}$ (X, Y) of the subject pixel is determined to be "1", that is, to become data representing "ejection".

The processing mentioned above is performed with respect to number "m" of pixels in one line and number "n" of lines in one page (step S16–step S19) and the processing is terminated. According to the above-mentioned processing, the light C inks are ejected to pixels defining a character, an image and the like printed with black ink, in what is called checker pattern so that printing of the light C ink is performed at substantially 50% of thinning rate to a black image.

The processing shown in FIG. 7 as well as an image processing and conversion to binary data are performed in the printer in the above-mentioned embodiments. However, it is not limited to this structure. For example, the above-stated processing may be performed by means of a printer driver in the host computer 206.

Moreover, in the above-mentioned embodiments, as to all kinds of images to be printed with the black ink, the light C ink and the Bk ink are applied in an overlaying manner.

However, in only the case of printing a character of black which is preferred to have relatively high OD vale, the light C ink may be applied on the Bk ink.

In this example, ink having a property of low penetration speed to the printing medium (hereafter simply called "hard penetration ink" in this example) is used for the black ink ejected from the head 101 Bk. On the other hand, ink having a property of high penetration speed to the printing medium (hereafter called "high penetration ink" in this example) is used for each of the light C, the cyan, magenta, and yellow inks ejected from the heads 101C', 101C, 101M, and 101Y respectively.

Here, a penetration speed of ink to the printing medium will be explained below.

It is known that when penetrability of ink is expressed, for example, by an ink volume V per 1 m$^2$, an ink penetration volume V (unit=ml/m$^2$=$\mu$m) in a time t after drops of ink were ejected can be expressed by Bristow formula as below:

$$V = Vr + Ka(t-tw)^{1/2}$$

here, Lt>tw

Just after a ink drop is deposited on a surface of a printing paper, the ink drops are mostly absorbed in the rugged part on the surface (a rough part on the printing paper surface), and does not penetrate into the printing paper yet. This period of time is tw (a wet time), and an absorbed volume into the rugged part in this period is Vr. When an elapse time after dropping of the ink drops exceeds tw, the penetration volume V increases by a portion proportional to the square root of (t−tw). Ka is a proportional coefficient of the increment and shows a value according to a penetration speed.

Figure 9:
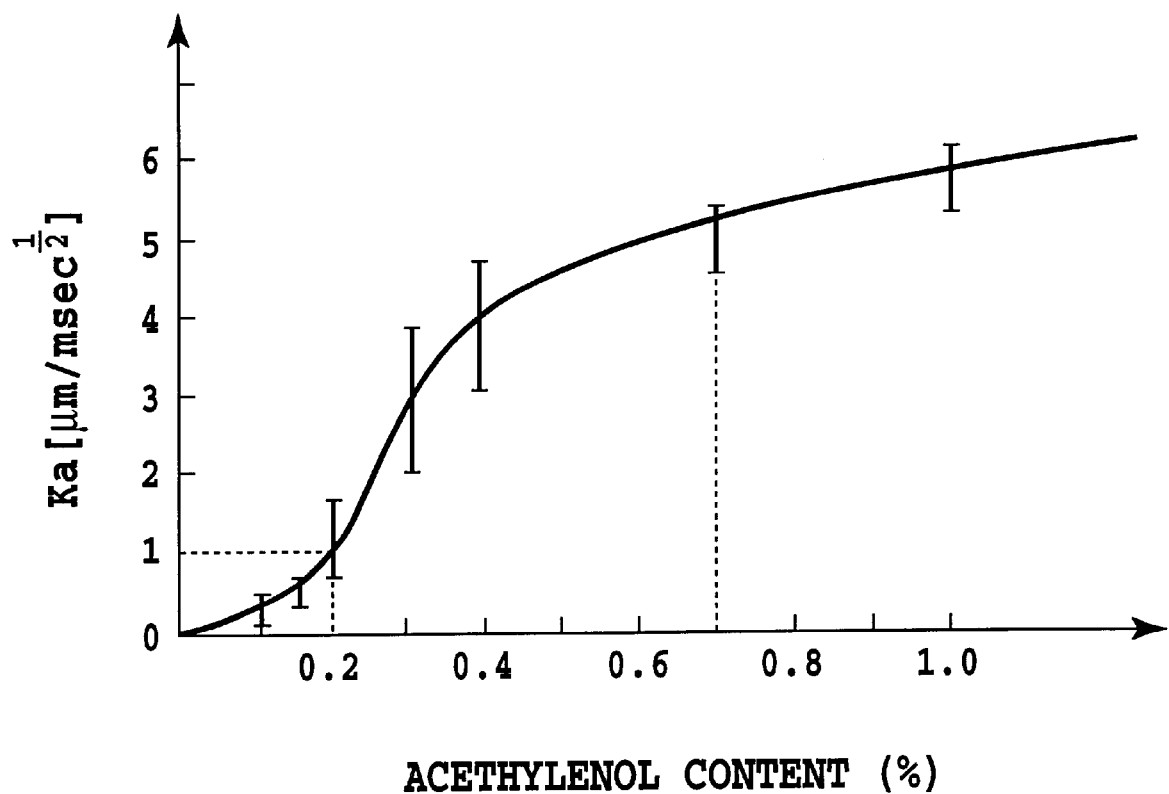
FIG. 9 is a graph showing a relation between a percentage content of acethylenol and Ka value indicating a penetration speed.

FIG. 9 is a curve showing a value of the proportional coefficient Ka to a content rate of ethylene oxide-2,4,7,9-tetramethyl-5-decyne-4,7-diol (hereafter called "acethylenol": a product name manufactured by "Kawaken Fine Chemical").

The values of Ka have been measured by using a liquid dynamic penetrability test equipment S (manufactured by "Toyo Seiki Seisakusho") according to Bristow Method. In this experiment, PB paper of Canon Inc., the assignee of the present invention, was used as printing paper. This printing paper is usable for a copying machine and Laser beam printer adopting an electrophography system as well as for a printer adopting an ink-jet printing system.

Moreover, similar result was obtained also to PPC paper, which is paper for electrophotography manufactured by Canon Inc.

In FIG. 9, the curve shows that Ka value (vertical axis) increases with increasing content rate (horizontal axis) of the acethylenol, and that the proportional coefficient Ka is determined by the content rate of acethylenol. Therefore, the penetration speed of ink is to be substantially determined by the content rate of the acethylenol. Here, the line segments intersecting the curve in parallel with the vertical axis show deviation ranges of the measurement result.

Figure 10A:
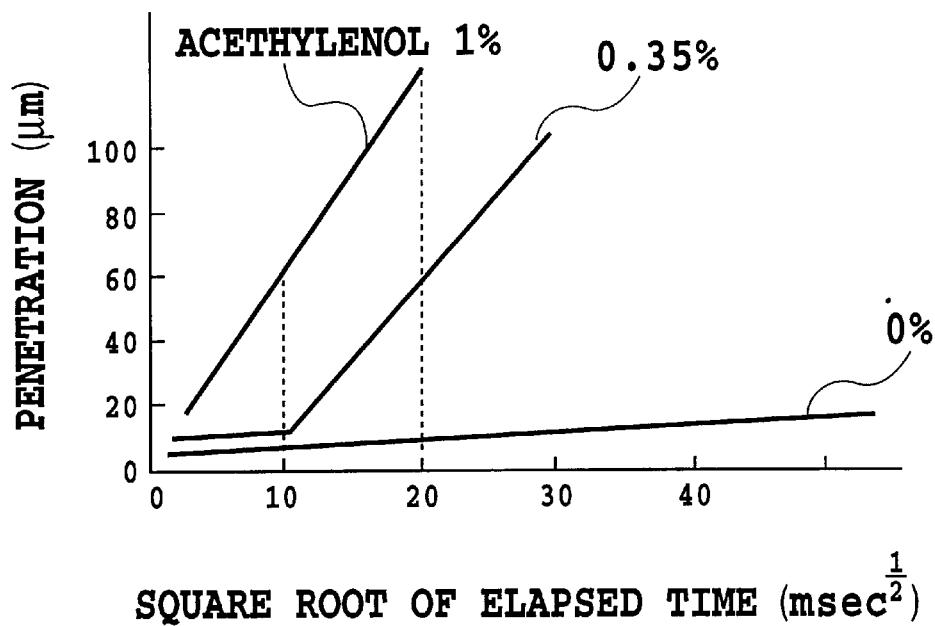
FIGS. 10A and 10B are characteristic charts respectively showing relations between penetration quantity of ink and elapse of time.
Figure 10B:
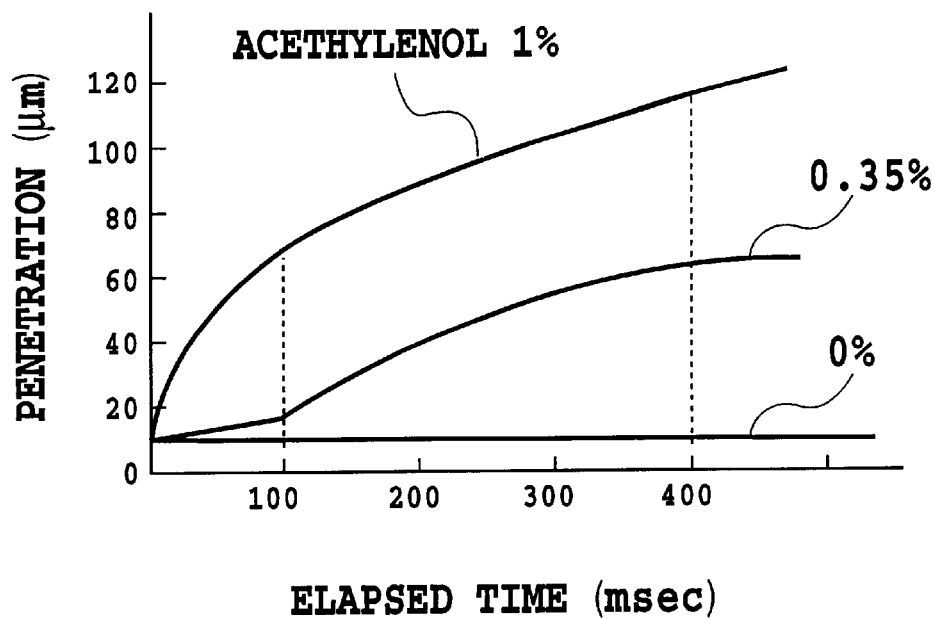

FIGS. 10A and 10B are characteristic curves showing relations between a penetration volume of ink and an elapse of time and these are the results of the experiments carried out by using the printing paper of 64 g/m$^2$, 80 $\mu$m thickness, and about 50% of voids.

In FIG. 10A, the horizontal axis is graduated in units of ½ power of an elapse of time t; (msec$^{1/2}$), and in FIG. 10B, the horizontal axis is graduated in units of an elapse of time t; (msec). And, in both figures, the vertical axes are graduated in penetration volumes ($\mu$m), and the curves are those when the content rates of the acethylenol are 0%, 0.35%, and 1% respectively.

As obvious from both figures, the higher the content rate of the acethylenol is, the more the penetration volume of ink to the elapse of time is, namely, penetrability is higher. In FIGS. 10A, 10B, the graphs show that there is such a tendency as the more the content volume of the acethylenol becomes, the shorter the wet time tw is, and even before the time of tw, the higher the content rate of the acethylenol is, the higher the penetrability is.

Moreover, in a case of an ink with which the acethylenol is not mixed (0% content rate), the penetrability of the ink is low and has a characteristic of an hard penetration ink which will be specified later. And, an ink mixed with 0.35% the acethylenol has an intermediate characteristic of semi-penetrability between the two cases.

Each characteristic of the above-described "hard penetration ink" and "high penetration ink", and the intermediate "semi-penetrative ink" between them is listed in Table 1.

TABLE 1

|  | Ka value (ml/m$^2$ msec$^{1/2}$) | Acethylenol content (%) | Surface tension (dyne/cm) |
| --- | --- | --- | --- |
| Hard penetration ink | Less than 1.0 | Less than 2.0 | Greater than or equal to 40 |
| Semi-penetration ink | Greater than or equal to 1.0, and less than 5.0 | Greater than or equal to 0.2, and less than 0.7 | Greater than or equal to 35, and less than 40 |
| High penetration ink | Greater than or equal to 5.0 | Greater than or equal to 0.7 | Less than 35 |

The above Table 1 lists Ka values, the acethylenol contents (%), and surface tensions (dyne/cm) concerning each of "hard penetration ink", "semi-penetration ink", and "high penetration ink", respectively. The penetrability of each ink to the printing paper of print medium becomes higher with an increasing value of Ka.

The Ka values listed in Table 1 were measured by using a liquid dynamic penetrability test equipment S (manufactured by Toyo Seiki Seisakusho) according to Bristow method. In the experiment, PB paper of Canon Inc., the Applicant of the present invention, was used as printing paper. Moreover, similar results were obtained with PPC paper of "Canon Inc."

Here, as a condition for letting a liquid contain a surface-active agent, it is known that there is a critical micelle concentration (CMC) of the surface-active agent in the liquid. This critical micelle concentration is a concentration at the time when a solution of a surface-active agent is increasing in the concentration and tens of molecules suddenly associate themselves to form a micelle. The acethylnol contained in the above-described inks for preparing the penetrability is a kind of surface-active agent, and similarly, acethylenol has also such critical micelle concentrations according to its solutions.

As a relation between an the acethylenol content rate and a surface tension when the acethylwnol content rate is prepared, there is such a relation as the surface tension will not decrease when the acethylenol comes to form micelle. From this fact, it is confirmed that the critical micelle concentration (CMC) of the acethylenol to water is approximately 0.7%.

If the critical micelle concentration shown in the figure is made to correspond to the aforementioned Table 1, it can be seen that for example, the "high penetration ink" specified in Table 1 contains the the acethylenol at a higher rate than the critical micelle concentration (CMC) of the acethylenol in water.

The compositions of the light C ink and other inks used for this example are as follows. The light C ink and other inks are made by adding the respective solvents to the respect coloring materials. Here, percentages (parts) of each component are expressed in parts by weight.

| [Light cyan (C') ink] | |
|---|---|
| Cationic dye (Basic dye) BB100 | 1 part. |
| Glycerin | 7 parts. |
| Diethyl glycol | 5 parts. |
| Acethylenol EH | 1 parts. |
| (manufactured by "Kawaken Fine Chemical") | |
| Polyallylamine | 4 parts. |
| Acetic acid | 4 parts |
| Benzylidine dichloride | 0.5 parts. |
| Triethylene glycol-monobutylether | 3 parts. |
| Water | remainder |
| [Yellow (Y) ink] | |
| C. I. direct yellow 86 | 3 parts. |
| Glycerin | 5 parts. |
| Diethylglycol | 5 parts. |
| Acethylenol EH | 1 parts. |
| (manufactured by "Kawaken Fine Chemicals") | |
| Water | remainder |
| [Magenta (M) ink] | |
| C. I. acid red 289 | 3 parts. |
| Glycerin | 5 parts. |
| Diethylglycol | 5 parts. |
| Acethylenol EH | 1 parts. |
| (manufactured by "Kawaken Fine Chemicals") | |
| Water | remainder |
| [Cyan (C) ink] | |
| C. I. direct blue 199 | 3 parts. |
| Glycerin | 5 parts. |
| Diethylene glycol | 5 parts. |
| Acethylenol EH | 1 parts. |
| (manufactured by "Kawaken Fine Chemicals") | |
| Water | remainder |
| [Black (Bk) ink] | |
| Pigment dispersion liquid | 25 parts. |
| Hood black 2 | 2 parts. |
| Glycerin | 6 parts. |
| Triethylene glycol | 5 parts. |
| Acethylenol EH | 0.1 parts. |
| (manufactured by "Kawaken Fine Chemicals") | |
| Water | remainder |

As obvious from the composition, the above black is a mixture of a pigment without dispersing agent and a dye used as a color material, and its pigment dispersion liquid is as the following:

[Pigment Dispersion Liquid]

1.58 g anthranilic acid is added to a solution of 5 g concentrated hydrochloric acid dissolved in 5.3 g water at 5° C. This solution is always kept at 10° C. or lower by stirring it in an ice-bath, and another solution of 1.78 g sodium nitrite added into 8.7 g water of 5° C. was added to the former solution. Further, after stirring it for 15 minutes, 20 g carbon black having 320 $m^2$/g surface area and 120 ml/100 g oil absorption quantity was added in a mixed state. And then, after stirring it for another 15 minutes, The slurry obtained is filtrated through Toyo's filter paper No.2 (made by "Advantis Co."); pigment particles are fully rinsed; are dried in an oven at 110° C.; and then, 10% wt. pigment solution is made by adding water to this pigment. By the above method, a pigment dispersion liquid 3 is obtained, in which self-dispersion type carbon black bonded to a hydrophilic radical via a phenyl radical and anionically electrified is dispersed on the surface as shown by the formula below.

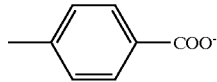

As obvious from the above compositions, according to the contents of the acethylenol, each of the pigment and dye for black ink is arranged as additional ink, and each of the C' (the light C) and the C, M, and Y inks is arranged as high penetration ink.

Moreover, the color material concentration of light C ink is 1% equivalent to 1/3 times as that of the color material concentration of C ink, and therefore, the OD obtained from solid printing with this the light C ink becomes 0.57 as shown in the aforementioned embodiment. And, in this example, ejecting data of the light C ink are made to 50% thinned-out data compared with those of the Bk ink, and the OD of the pattern is made to 0.4. Thus, even if the positional deviation between the Bk ink and the light C ink in ink ejecting becomes about 200 $\mu$m, it is possible to make the positional deviation in ink ejecting inconspicuous with the device in this example, and also obtain a predetermined density of the Bk ink dots.

A positional deviation of 100 $\mu$m is not a problem even if the data for light C are not thinned out, and also OD of Bk pixels becomes high, therefore, it is selective one way or another depending on a degree of deviation generated.

Moreover, for pigment for black, a pigment without dispersing agent, what is called, a dispersant-less pigment, is used. In this ink, self dispersing type carbon black is appropriately used, in which at least a kind of hydrophilic radical is directly or via other atomic group as an anionic carbon black dispersing element. Moreover, this self-dispersing type carbon black is preferred to have an ionicity, and an anionically electrified one is suitable.

In the case of the anionically electrified carbon black, such cases can be mentioned as the hydrophilic radicals bonded to the surface are, for example, $-COOM$, $-SO_3M$, $-PO_3HM$, $-PO_3M_2$, $-SO_2NH_2$, $-SO_2NHCOR$, etc. (however, in the formulae, M represents hydrogen atom, alkaline metal, ammonium or organic ammonium and R represents alkyl group with 1–12 carbon atoms, phenyl group allowed to have substituent(s), or naphthyl group allowed to have substituent(s)). In this embodiment, it is desirable to use carbon black in which especially, $-COOH$ or $-SO_3M$ of the above radicals is bonded to the carbon black surface and which is anionically electrified.

Moreover, for "M" of the above-mentioned hydrophilic radicals, for example, lithium, kalium, etc. can be mentioned as alkaline metals, and for organic ammonium, mono-or trimethyl ammonium, mono- or triethyl ammonium, and mono- or trimethanol ammonium can be mentioned. As a method of obtaining anionically electrified carbon black, namely, a method of introducing $-COONa$ on the carbon black surface, for example, a method by which the carbon black is oxidation-processed with sodium hypochlorite, however, the present invention is not to be restricted to this method.

In this preferred embodiment, it is desirable to use carbon black bonded to a hydrophilic radical on the surface via other atomic group. For other atomic groups, for example, alkyl group having 1–12 carbon atoms, phenyl group allowed to have substituent or naphtyl group allowed to have substituent, etc. can be mentioned. As preferred examples of hydrophilic groups bonded to the surface of carbon black via other atomic group other than the above-mentioned groups, for example, —$C_2H_4COOM$, —$PhSO_3M$, —PhCOOM, etc. (here, Ph represents phenyl group) can be mentioned. However, it is obvious that the present invention is not to be restricted to these.

Since this carbon black of the dispersant-less pigment is in itself excellent in water dispersibility compared with conventional carbon black, it is not necessary to add a pigment dispersing resin, a surface active agent, etc., and so it has such advantages as better sticking tendency, better wettability, etc. compared with conventional pigment ink and has an excellent reliability when used for print heads.

By using the black ink in accordance with the preferred embodiment mentioned above, and in the liquid state in which carbon particles and black pigment of a same polarity are mixed and also dispersed, the mixture is reacted with cationic the light C ink containing polymer with the opposite polarity.

In this preferred embodiment, ink-jet orifices of each head are arrayed with a density of 600 dpi, and also performs printing with a dot density of 600 dpi in the transport direction of printing paper. Thus, the dot density of a picture, etc. printed in this preferred embodiment becomes 600 dpi both in row and column directions. Moreover, a eject-frequency of each head is 4 kHz, therefore, a transport speed of printing paper is approximately 170 mm/sec. Further, a distance Di (refer to FIG. 5) between the head 101 Bk and the head 101C' of the light C ink is 40 mm, and so it takes about 0.1 sec from ejecting of black ink to that of the light C ink. Here, a eject volume rate of each head is about 18 pl per one time of ejecting.

In this case, the OD of a Bk pixel is about 1.7 when the OD of the C dot takes 0.57, and the OD of the Bk pixel is about 1.6 at when the OD of the C dot takes 0.4.

It should be noted that a kind of the dye as the coloring material in the light cyan ink is Basic Blue (BB) 100, but Basic Blue (BB) 47 may also be used for the light cyan ink instead of BB 100. In this case, percentage of BB 47 is preferred to be between 0.2 weight % and 1.0 weight %.

The inks which include a cationic dye of BB 10 or BB 47 as coloring material and other cationic material as required can make the black ink of anion insoluble so as to improve print quality. More specifically, since an image or the like printed with such cationic dye does not show so high OD, the cationic dye is preferable as a light ink to using with the black ink for acting therewith. In addition, the cationic dye may be made have high penetration ability to improve fixing ability when the cationic dye is used with the black ink.

On the full line type printer described above, the print heads are used in the fixed state in the printing operation and the time required for transporting a sheet of printing paper is about the time necessary for printing, and so this type of printer is suitable especially for high speed printing. Therefore, it is possible to further improve the high speed printing performance and achieve also high quality printing by applying the present invention to such a high speed printing equipment.

The printing equipment in this preferred embodiment is most generally used as a printer, however, it is apparent that the printing equipment can also be configured as a printing part of a copying machine, a facsimile, etc. and is not restricted to the embodiment.

(Embodiment 2)

Figure 8:
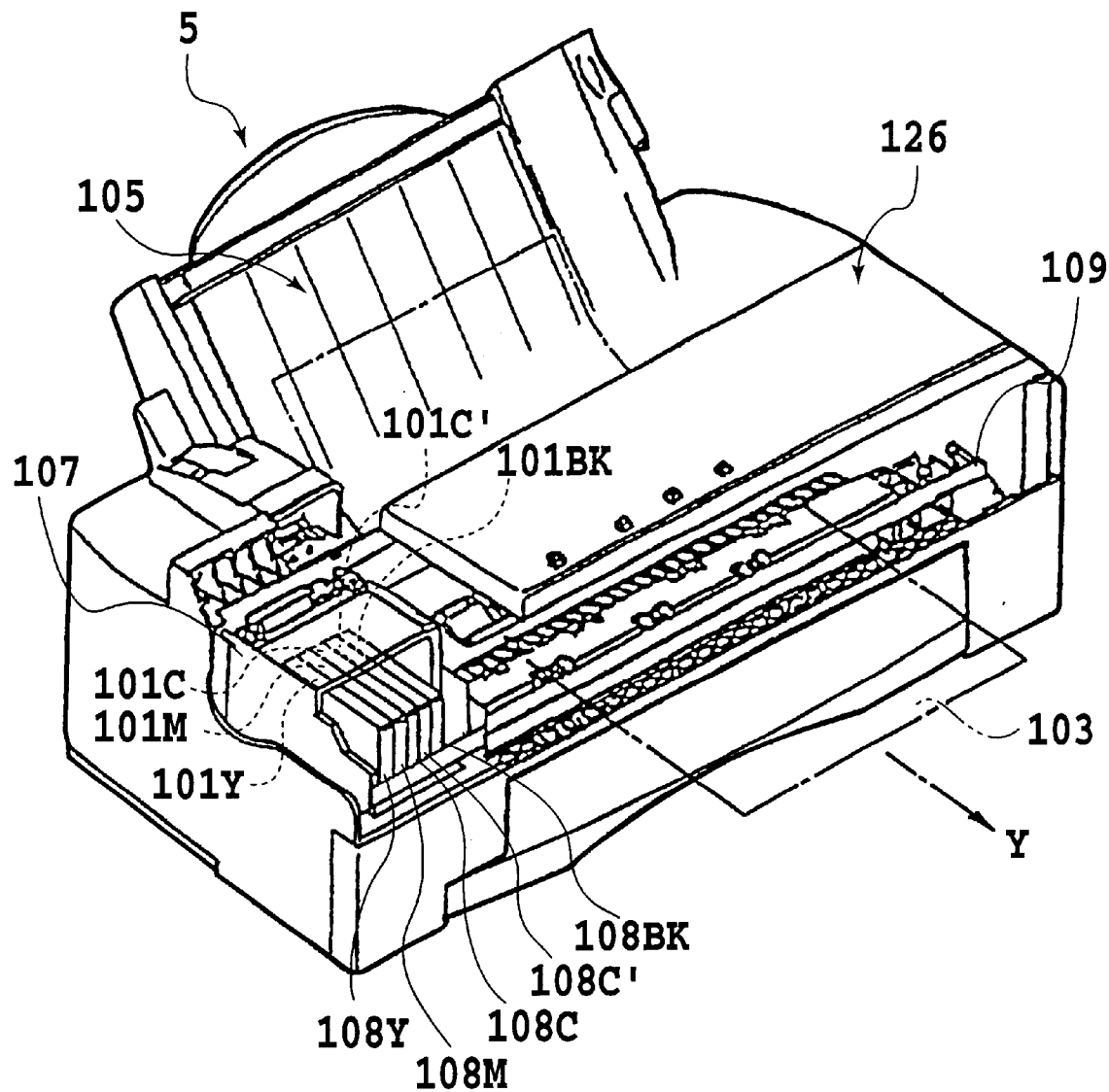
FIG. 8 is a perspective view showing a printing apparatus related to another embodiment of the present invention.

FIG. 8 is a schematic perspective view showing a configuration of a serial type printer 5 related to a second embodiment. Namely, it is obvious that the printer adding a mixture of inks to a printing medium before ejecting a processing solution for react it with the mixture is applicable not only to the above-mentioned full line type but also to a serial type. Here, similar elements to those shown in FIG. 5 are marked with the same signs without detail description on them.

Printing paper 103 as printing medium is inserted from a paper feeding part 105 and ejected via a printing part 126. In this preferred embodiment, inexpensive normal paper in wide use is used for the printing paper 103. In a printing part 126, a carriage 107 mounts the print heads 101 Bk, 101C', 101C, 101M, and 101Y thereon, and is constituted to be able to move back and forth along a guide rail 109 by a driving force of an not-shown motor. As in the above-mentioned 1st embodiment 1, the print head 101 BK ejects an ink using a mixture of dye and pigment as a color material. Moreover, the print heads 101S, 101C, 101M, and 101Y ejects light cyan ink, cyan ink, magenta ink, and yellow ink, respectively, and are driven so as to eject the inks on the printing paper in this order. Here, the color material concentration of the light cyan ink is about ⅓ times equivalent to 1%, and thus, the deviation about up to 100 μm at the maximum is made inconspicuous which is generated when overlapped on the Bk ink with an OD of the light cyan ink set to about 0.57.

Each head is supplied with ink corresponding to respective ink tanks 108 Bk, 108V', 108C, 108M, and 108Y, and a driving signal is supplied to an electric thermal converter (heater) provided on the each eject orifice of each head at the time of ejecting; the thermal energy acts on the inks to generate air bubbles; and the inks are ejected by making use of the pressure at bubbling. Each head is provided with 64 pieces of eject orifices in a density of 360 dpi, and these are arranged approximately in the same direction Y of transporting the printing paper 103, namely, in the direction approximately vertical to the scanning direction of each head. And, each eject orifice has a eject volume rate of 23 pl.

In the above configuration, each head is arranged at ½ inch intervals, and since the printing density is 720 dpi in the direction of scanning and each head has a eject frequency of 7.2 kHz, it takes 0.025 sec until the light C ink is ejected from the head 101C' after the Bk ink is ejected from the head 101 Bk.

Figures 11A, 11B, 11C:
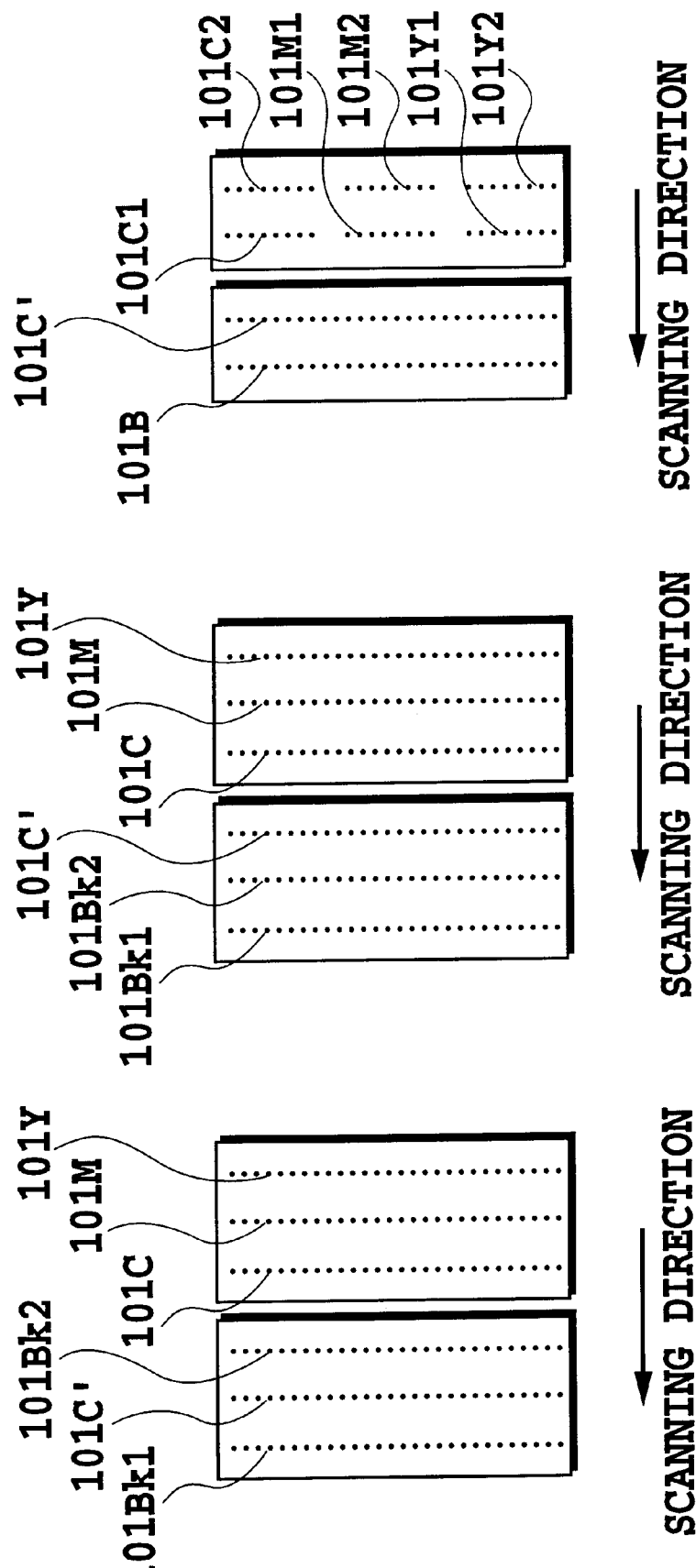
FIGS. 11A–11C are schematic drawings respectively showing print head configurations of printing apparatuses related further to other embodiments of the present invention.

FIGS. 11A–11C show other examples of the head arrangement on the serial type printer shown in FIG. 8 and schematic drawings of the ejection orifice arrangements, respectively.

As shown in FIG. 11A, the arrangement is allowed to be provided with two ejecting parts for ejecting black inks (ejecting parts 101 Bk1, 101 Bk2) and a ejecting part 101C' for ejecting the light C ink between the two ejecting parts. In this case, the black ink is ejected before the light C ink is ejected. Moreover, the black ink is allowed to be further ejected after that.

The head arrangements shown in FIG. 11A as well as FIGS. 11B, 11C are structures integrating heads for several inks, and in this single-piece structure of a head unit, ejection orifices and liquid chambers communicating with the orifices are of course separated from each other. Therefore, each ejecting part is similar one to the head of each ink.

Figure 12A:
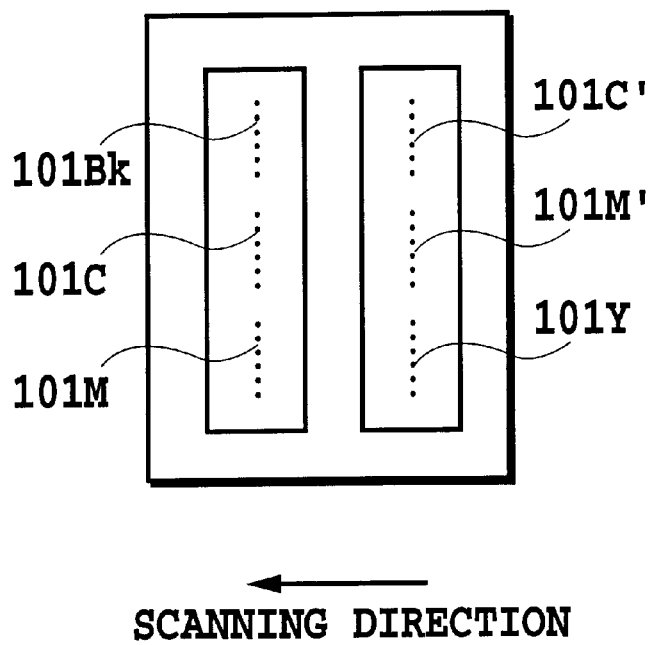
FIGS. 12A and 12B are schematic drawings showing head configurations of a printing apparatuses related further to other embodiments of the present invention.
Figure 12B:
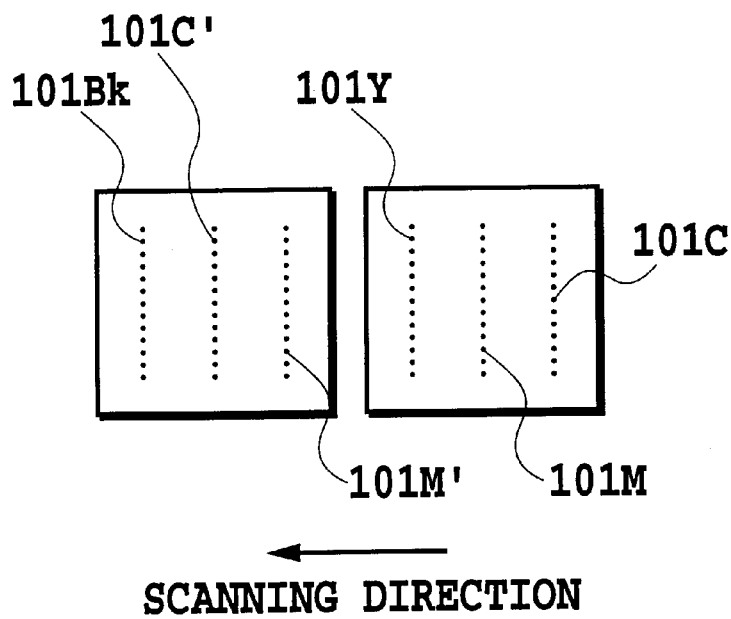

FIGS. 12A and 12B are schematic drawings showing other examples of head units used for the above-mentioned serial type device.

The example shown in FIG. 12A is a type in which the ejecting parts of Bk, C, and M are arranged in the longitudinal direction, and these ejecting parts have a single-piece construction. Similarly, the ejecting parts 101C', 101M', 101Y of light C, light M, and Y are arranged in the longitudinal direction, and these are also to be integrated.

Here, the unit for the Bk ink and the light C ink is formed so that they are ejected at a same pixel with respect to the scanning and those ejecting parts are correspondingly in parallel with each other. This arrangement makes it possible to eject the cationic light C' ink following the Bk ink for overlaying thereon.

Here, the column of the ejecting parts of Bk, C, and M inks and that of the ejecting parts of light C, light M, and Y inks may be a single-piece construction as a print head.

Moreover, Bk, C, and M parts may be arranged as a column dedicated to anionic color material ejecting parts, and light C, light M, and Y parts may be arranged as a column dedicated to cationic color material. Then, the inks are not mixed and does not react into produce insoluble matters even if recovery actions such as absorbing ink, wiping ink or the like, etc. are carried out. Therefore, it is also possible to simplify the configuration of the recovery system.

In the embodiment shown in FIG. 12B, head units, in which three columns of ejecting parts are formed into a single body, are arranged in two scanning directions. The preceding head unit for ejecting to the scanning has the ejecting parts of the Bk ink, the light C ink, and the light M ink, and in the other head unit, the ejecting parts of Y ink, M ink, and the C ink are arranged.

Also in this case, only the light C ink is cationic.

It should be noted that the configuration that the Bk ink is applied on the printing medium, thereafter, the light C ink is applied is explained. In stead of this, it may be also within the present invention that the light C ink is applied and then the Bk ink is applied on the light C ink. However, it is preferable that the Bk ink is applied and then the light C ink is applied, from a point of view of improving the rubbing resistance preventing a printed image from changed with a line-marker.

As explained above, according to the embodiments of the present invention, in a case of forming an image of a black series, a low concentration colored ink having an opposite polarity to that of a black series ink is added thereto in an overlaying manner. Then, the deviation can be made visually unrecognized for the low concentration of the colored ink even if the overlaid condition of inks is not within a predetermined range. In addition to an increase in density due to insolublization of the black series ink, this increase in the density of the black image can be achieved within a range in which no change is recognized in the hue.

As a result, even when variations in accuracy of transporting a printing paper and mounting a print head in a printer and a deviation between ejection positions of a black ink and an ink overlaid thereon is caused due to the variation in the accuracy, high quality printing can be performed while allowing such deviation.

An ejection amount from a Bk head required for increasing density of a coloring material on a surface of a printing medium can be made as small as possible. It should be noted that an ejection order of Bk ink and low concentration colored ink is not limited to one example as discussed above. The light colored ink ay be ejected before ejection of the Bk ink.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink printing method comprising the steps of:
   employing a black ink and a low concentration colored ink which has a lower concentration than a colored ink with higher lightness than that of said black ink, has a same type of color as that of said colored ink and has a polarity different from said black ink: and
   forming a black image by at least partly making said black ink, which is applied in accordance with black ink data, react with said low concentration colored ink applied in accordance with low concentration colored ink data which is generated based on said black ink data.

2. An ink printing method as claimed in claim 1, wherein said black ink has a coloring material which is made by mixing a pigment with a dye.

3. An ink printing method comprising the steps of:
   employing a black ink, one of or a plurality of colored inks having higher lightness than said black ink and a low concentration colored ink which has a lower concentration than said colored ink, has a same type of color as that of said colored ink and has a polarity different from that of said black ink; and
   forming a black image by at least partly making said black ink, which is applied in accordance with black ink data, react with said low concentration colored ink applied in accordance with low concentration colored ink data which is generated based on said black ink data.

4. A ink printing method as claimed in claim 3, wherein said black ink, said colored ink, and said low concentration colored ink are ejected from individual ink ejection parts to form an image, and said black image is formed by ejecting said low concentration colored ink and said black ink one upon another.

5. An ink printing method as claimed in claim 4, wherein said low concentration colored ink is a light blue ink.

6. An ink printing method as claimed in claim 5, wherein said light blue ink is a light cyan ink.

7. An ink printing method as claimed in claim 6, wherein said black ink has an anionic property and said light cyan ink has a cationic property.

8. An ink printing method as claimed in claim 4, wherein said low concentration colored ink is ejected after said black ink is ejected so that said low concentration colored ink is overlaid on said black ink.

9. An ink printing method as claimed in claim 8, wherein said black ink has an anionic property and said low concentration colored ink has a cationic property.

10. An ink printing method comprising the steps of:
    employing a plurality of colored inks different from a black ink and having higher lightness than that of said black ink, and a low concentration colored ink having a lower concentration than that of said colored ink and a different polarity from that of said colored ink; and
    forming an image of a color by at least partly making said colored ink react with said low concentration colored ink,
    wherein said colored ink and said low concentration colored ink have a same type of color to each other.

11. An ink-jet printing apparatus for performing printing comprising:
    ink ejection parts respectively ejecting a black ink, and a low concentration colored ink which has a lower concentration than a colored ink with higher lightness than that of said black ink, has a same type of color as that of said colored ink and has a polarity different from said black ink; and means for forming a black image by at least partly making said black ink, which is applied in accordance with black ink data, react with said low concentration colored ink applied in accordance with low concentration colored ink data which is generated based on said black ink data.

12. An ink-jet printing apparatus as claimed in claim 11, wherein said black ink has a coloring material which is made by mixing a pigment with a dye.

13. An ink-jet printing apparatus for performing printing comprising:

ink ejection parts respectively ejecting a black ink, one of or a plurality of colored inks having higher lightness than said black ink and a low concentration colored ink which has a lower concentration than said colored ink, has a same type of color as that of said colored ink and has a polarity different from that of said black ink, and means for forming a black image by at least partly making said black ink, which is applied in accordance with black ink data, react with said low concentration colored ink applied in accordance with low concentration colored ink data which is generated based on said black ink data.

14. A ink-jet printing apparatus as claimed in claim 13, wherein said black ink, said colored ink, and said low concentration colored ink are ejected from individual ink ejection parts to form an image, and said black image is formed by ejecting said low concentration colored ink and said black ink one upon another.

15. An ink-jet printing apparatus as claimed in claim 14, wherein said low concentration colored ink is a light blue ink.

16. An ink-jet printing apparatus as claimed in claim 15, wherein said light blue ink is a light cyan ink.

17. An ink-jet printing apparatus as claimed in claim 16, wherein said black ink has an anionic property and said light cyan ink has a cationic property.

18. An ink-jet printing apparatus as claimed in claim 14, wherein said low concentration colored ink is ejected after said black ink is ejected so that said low concentration colored ink is overlaid on said black ink.

19. An ink-jet printing apparatus as claimed in claim 18, wherein said black ink has an anionic property and said low concentration colored ink has a cationic property.

20. An ink-jet printing apparatus for performing printing comprising:

ink ejection parts respectively ejecting a plurality of colored inks different from a black ink and having higher lightness than that of said black ink, and a low concentration colored ink having a lower concentration than that of said colored ink and a different polarity from that of said colored ink; and means for forming a colored image by at least partly making said colored ink react with said low concentration colored ink, wherein said colored ink and said low concentration colored ink have a same type of color to each other.

21. An ink-jet printing apparatus as claimed in claim 20, wherein said black ink, said colored ink, and said low concentration colored ink are ejected from individual different ink ejection parts.

22. An ink-jet printing apparatus as claimed in claim 20, wherein respective ink ejection parts ejecting said black ink and said low concentration colored ink are arranged in a scanning direction along which said ink ejection parts are scanned.

23. An ink-jet printing apparatus as claimed in claim 20, wherein respective ink ejection parts ejecting said black ink said colored ink and said low concentration colored ink have ink ejection parts arranged in an extent corresponding to a width of a printing area on a printing medium.

24. An ink-jet printing apparatus as claimed in claim 20, wherein said colored ink includes cyan, magenta and yellow ink and a lower concentration magenta ink than said magenta ink, and said low-concentration colored ink includes a cyan ink of a lower concentration than said cyan ink, respective ink ejection orifice arrays of said black ink, said cyan ink, and said magenta ink are arranged in a different direction from the scanning direction along which said ink ejection orifice arrays are scanned, and respective ink ejection orifice arrays of said low concentration cyan ink, said low concentration magenta ink and said yellow ink are arranged in said different direction and disposed beside said ink ejection orifice arrays of said black ink, said cyan ink, and said magenta ink in said scanning direction.

25. An ink-jet printing apparatus as claimed in claim 20, wherein said colored ink include cyan, magenta and yellow inks and a lower-concentration magenta ink than said magenta ink and respective ejection orifice arrays of said black ink, said low concentration cyan ink, said low concentration magenta ink, said yellow ink and said cyan ink are arranged in the scanning direction.

26. An ink-jet printing apparatus as claimed in claim 20, wherein said ink ejection part generates a bubble in ink by using thermal energy and ejects the ink by a pressure of the bubble.

27. An ink set comprising:

a low concentration colored ink which is employed together with a black ink and one or a plurality of colored inks having higher lightness than said black ink in a printing apparatus, the low concentration colored ink having a lower concentration than said colored ink and a same type color as said colored ink, and said low concentration colored ink having an opposite polarity to at least said black ink to have a function of making said black ink insoluble.

28. An ink set as claimed in claim 27, wherein said low concentration colored ink and said black ink are of opposite polarity to each other.

29. An ink set as claimed in claim 28, wherein said low concentration colored ink has a cationic property and said black ink has anionic property.

30. An ink set as claimed in claim 29, wherein said low concentration colored ink includes a cationic dye.

31. A ink set as claimed in claim 30, wherein said low concentration ink has lower concentration than said colored ink, when comparing them to each other at a concentration of coloring material in ink.

32. An ink set as claimed in claim 30, wherein said low concentration ink shows lower density than said colored ink, when comparing them to each other at a density measured for a predetermined printed image on a printing medium respectively.

33. A ink set as claimed in claim 32, wherein said predetermined printed image is a thinned pattern printed with said low concentration colored ink.

34. An ink set as claimed in claim 27, wherein said black ink has a coloring material which is made by mixing a pigment with a dye.

35. An ink set comprising:

a black series ink; and a low concentration ink which has lower concentration than a colored ink having higher lightness than said black ink, has a same type color as said colored ink and has an opposite polarity to said black ink to have a function of making said black series ink soluble.

36. An ink set as claimed in claim 35, wherein said low concentration ink contains a coloring material at 1 weight %.

37. An ink set as claimed in claim 35, wherein an optical density measured for a predetermined image printed with said low concentration ink on a printing medium has a value between 0.2 and 0.6.

38. An ink set as claimed in claim 37, wherein said predetermined image is a thinned pattern printed with said low concentration colored ink.

39. An ink set comprising:

a cyan ink; and a low concentration cyan ink having an opposite polarity to a black ink to have a function of making said black ink insoluble and having lower concentration than said cyan ink.

40. An ink set as claimed in claim 39, wherein said low concentration cyan ink has lower concentration than said cyan ink, when comparing them to each other at a concentration of coloring material in ink.

41. An ink set as claimed in claim 39, wherein said low concentration cyan ink shows lower density than said cyan ink, when comparing them to each other at a density measured for a predetermined printed image on a printing medium respectively.

42. An ink set as claimed in claim 41, wherein said predetermined printed image is a thinned pattern printed with said low concentration cyan colored ink.

43. An ink set comprising:

a black ink;

a yellow ink;

a magenta ink;

a cyan ink; and a low concentration cyan ink having a function of making at least said black ink insoluble and having lower concentration than said cyan ink.

44. An ink set as claimed in claim 43, wherein said low concentration cyan ink has lower concentration than said cyan ink, when comparing them to each other at a concentration of coloring material in ink.

45. An ink set as claimed in claim 43, wherein said low concentration ink shows lower density than said cyan ink, when comparing them to each other at a density measured for a predetermined printed image on a printing medium respectively.

46. An ink set as claimed in claim 45, wherein said predetermined printed image is a thinned pattern printed with said low concentration cyan colored ink.

47. An ink manufacturing method of manufacturing a low concentration colored ink which is employed together with a black ink and one or a plurality of colored inks having higher lightness than said black ink in a printing apparatus, has lower concentration than said colored ink and has a same type color as said colored ink has, said method comprising the steps of:

providing a coloring material for said low concentration colored ink having an opposite polarity to said black ink to have a function of making said black ink insoluble; and adding a solvent to said coloring material to manufacture said low concentration colored ink.

48. A rubbing resistance improving method used when performing printing with a black ink and a low concentration colored ink having lower concentration than a colored ink which has higher lightness than said black ink, having a same color as said colored ink and having a function making said black ink insoluble, said method comprising the steps of:

ejecting said black ink in accordance with black ink data; and ejecting said low concentration ink in accordance with low concentration colored ink data generated based on said black ink data, on said black ink after ejection of said black ink.

49. A rubbing resistance improving method as claimed in claim 48, wherein said low concentration colored ink is a low concentration cyan ink.

50. An ink ejection data generation method comprising the steps of:

providing ejection data for a black ink; and generating ejection data for a low concentration colored ink having lower concentration than a colored ink which has higher lightness than said black ink, having a same type color as said colored ink and having a function of making said black ink insoluble, so that a dot pattern is formed on a printing medium in a pattern according to a predetermined algorithm, on a dot pattern of said black ink formed based on said ejection data for said black ink.

51. An ink printing method comprising the steps of:

employing a black ink, one of or a plurality of colored inks having higher lightness than said black ink and a low concentration colored ink which has a lower concentration than said colored ink, has a same type of color as that of said colored ink and has a polarity different from that of said black ink; and forming a black image by at least partly making said black ink react with said low concentration colored ink without making said black ink react with said colored ink.

52. An ink-jet printing apparatus for performing printing comprising:

ink ejection parts respectively ejecting a black ink, one of or a plurality of colored inks having higher lightness than said black ink and a low concentration colored ink which has a lower concentration than said colored ink, has a same type of color as that of said colored ink and has a polarity different from that of said black ink; and, means for forming a black image by at least partly making said black ink react with said low concentration colored ink without making said black ink react with said colored ink.

* * * * *

UNITED STATES PATENT AND TRADEMARK OFFICE
CERTIFICATE OF CORRECTION

PATENT NO.     : 6,533,392 B1
DATED          : March 18, 2003
INVENTOR(S)    : Noribumi Koitabashi It is certified that error appears in the above-identified patent and that said Letters Patent is hereby corrected as shown below:

Drawings,
FIG. 7, Sheet 8, "SATRT" should read -- START --.

Column 1,
Line 25, "0ú" should read -- of --.

Column 2,
Line 27, "Moreover." should read -- Moreover, --.
Line 31, "between" should read -- between, --.
Line 58, "a" should read -- an --.

Column 3,
Line 23, "inkjet" should read -- ink-jet --.
Line 48, "the a" should read -- the --.
Line 51, "partly" should read -- polarity --.

Column 4,
Lines 14 and 17 "the a" should read -- the --.
Line 25, "the" should be deleted.

Column 7,
Line 26, "ben" should read -- been --.

Column 8,
Line 65, "C-ink" should read -- C ink --.

Column 10,
Line 24, "a" should read -- an --.
Line 54, "in." should read -- in --.

Column 12,
Line 7, "a" should read -- an --.

Column 14,
Line 11, "an" should read -- a --.
Line 58, "the" should be deleted.
Line 59, "acethylwnol" should read -- acethylenol --.

UNITED STATES PATENT AND TRADEMARK OFFICE
CERTIFICATE OF CORRECTION

PATENT NO. : 6,533,392 B1
DATED : March 18, 2003
INVENTOR(S) : Noribumi Koitabashi It is certified that error appears in the above-identified patent and that said Letters Patent is hereby corrected as shown below:

Column 15,
Line 1, "the the" should read -- the --.
Lines 15, 25, 31 and 38, "1 parts." should read -- 1 part. --.
Line 17, "4 parts" should read -- 4 parts. --.

Column 17,
Line 31, "a" should read -- an --.
Line 46, "using" should read -- use --.

Column 18,
Line 14, "an" should read -- a --.
Lines 37, 40 and 50, "a" should read -- an --.

Column 20,
Line 10, "ink:" should read -- ink; --.

Column 22,
Line 5, "black ink" should read -- black ink, --.
Lines 53 and 62, "A" should read -- An --.

Signed and Sealed this

Eleventh Day of November, 2003

JAMES E. ROGAN
*Director of the United States Patent and Trademark Office*